(12) United States Patent
Patterson

(10) Patent No.: US 9,494,143 B1
(45) Date of Patent: Nov. 15, 2016

(54) ION PROPULSION THRUSTER INCLUDING A PLURALITY OF ION OPTIC ELECTRODE PAIRS

(71) Applicant: The United States of America as represented by the Administrator of the National Aeronautics and Space Administration, Washington, DC (US)

(72) Inventor: Michael J. Patterson, Brunswick, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 108 days.

(21) Appl. No.: 14/152,125

(22) Filed: Jan. 10, 2014

Related U.S. Application Data

(63) Continuation of application No. 12/894,565, filed on Sep. 30, 2010, now Pat. No. 8,468,794.

(60) Provisional application No. 61/295,326, filed on Jan. 15, 2010.

(51) Int. Cl.
*F03H 1/00* (2006.01)
*H01J 27/02* (2006.01)
*B64G 1/40* (2006.01)

(52) U.S. Cl.
CPC ............ *F03H 1/0037* (2013.01); *B64G 1/405* (2013.01); *F03H 1/0043* (2013.01); *H01J 27/024* (2013.01)

(58) Field of Classification Search
CPC ... F03H 1/0037; F03H 1/0043; B64G 1/405; H01J 27/024
See application file for complete search history.

(56) References Cited

U.S. PATENT DOCUMENTS

| | | | | |
|---|---|---|---|---|
| 5,269,131 A | * | 12/1993 | Brophy | F03H 1/0043 60/202 |
| 5,369,953 A | * | 12/1994 | Brophy | B64G 1/405 313/359.1 |
| 5,465,023 A | * | 11/1995 | Garner | F03H 1/0043 313/293 |
| 6,590,324 B1 | * | 7/2003 | Kanarov | H01J 27/022 313/299 |

OTHER PUBLICATIONS

NASA, "Ion Optics for High Power 50 cm diam Thrusters", 1989, 25th Joint Propulsion Conference.*
NASA, "Ion Propulsion: Farther, Faster, Cheaper", 2004, http://www.nasa.gov/centers/glenn/technology/Ion_Propulsion1.html.*
NASA, "The 30cm J series Mercury Bombardment Thruster", 1981, AIAA/JSASS/DLGR 15th International Electric Propulsion Conference.*
NASA, "Technology Investments in Electric Propulsion", 2002, Third International Conference on Spacecraft Propulsion.*
Sankovic, "NASA Technology Investments in Electric Propulsion: New Directions in the New Millenium", 2000, Proc. 3rd International Conference on Spacecraft Propulsion.*

* cited by examiner

*Primary Examiner* — Phutthiwat Wongwian
*Assistant Examiner* — William Breazeal
(74) *Attorney, Agent, or Firm* — Robert H. Earp, III

(57) ABSTRACT

Ion optics for use in a conventional or annular or other shaped ion thruster are disclosed including a plurality of planar, spaced apart ion optic electrode pairs sized to include a diameter smaller than the diameter of thruster exhaust and retained in, on or otherwise associated with a frame across the thruster exhaust. An electrical connection may be provided for establishing electrical connectivity among a set of first upstream electrodes and an electrical connection may be provided for establishing electrical connectivity among the second downstream electrodes.

10 Claims, 18 Drawing Sheets

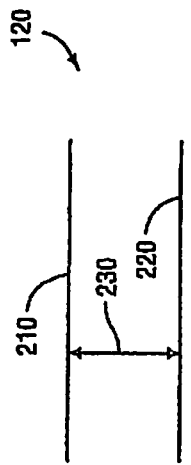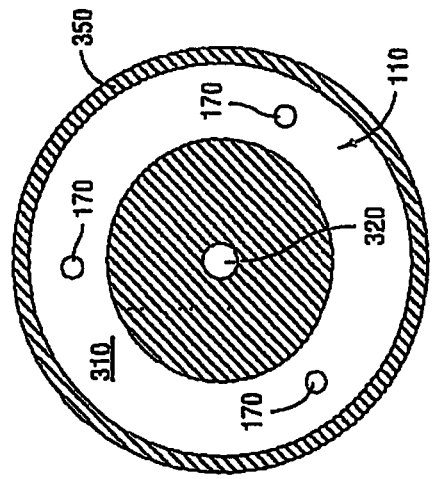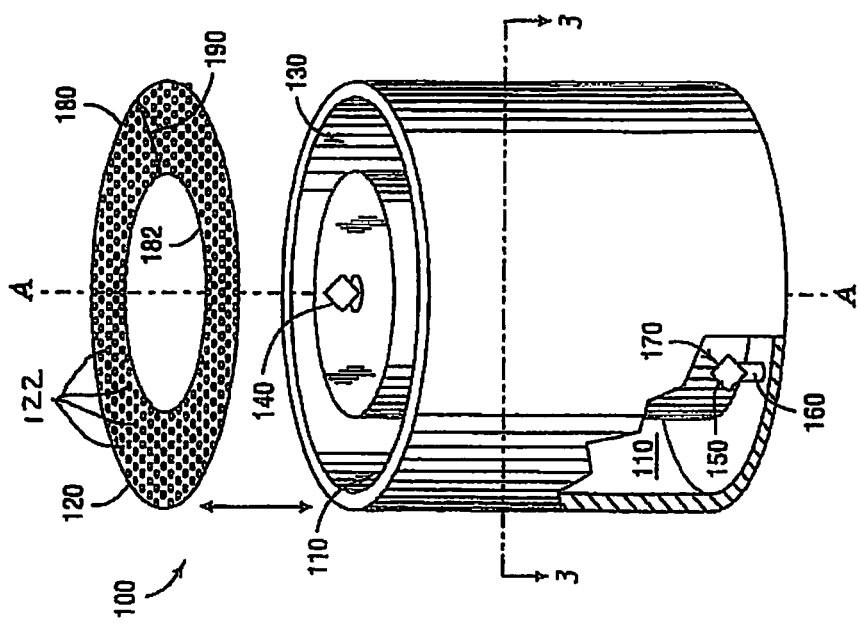

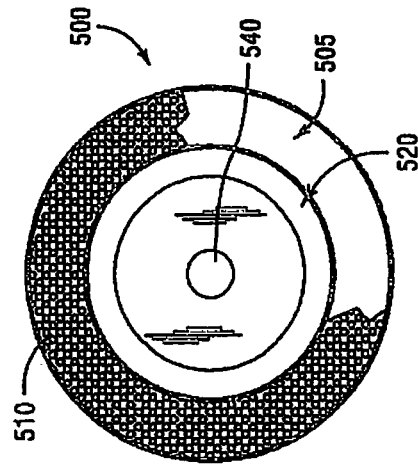
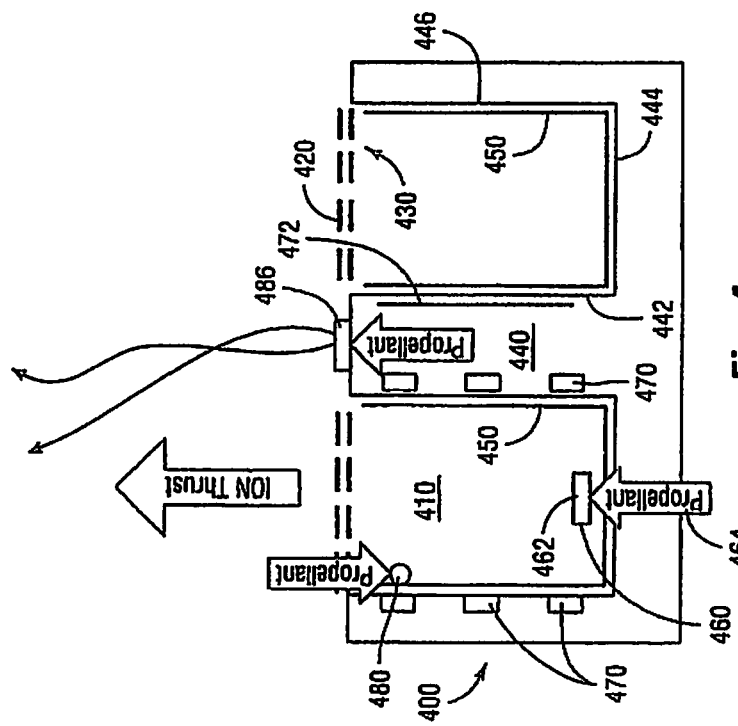

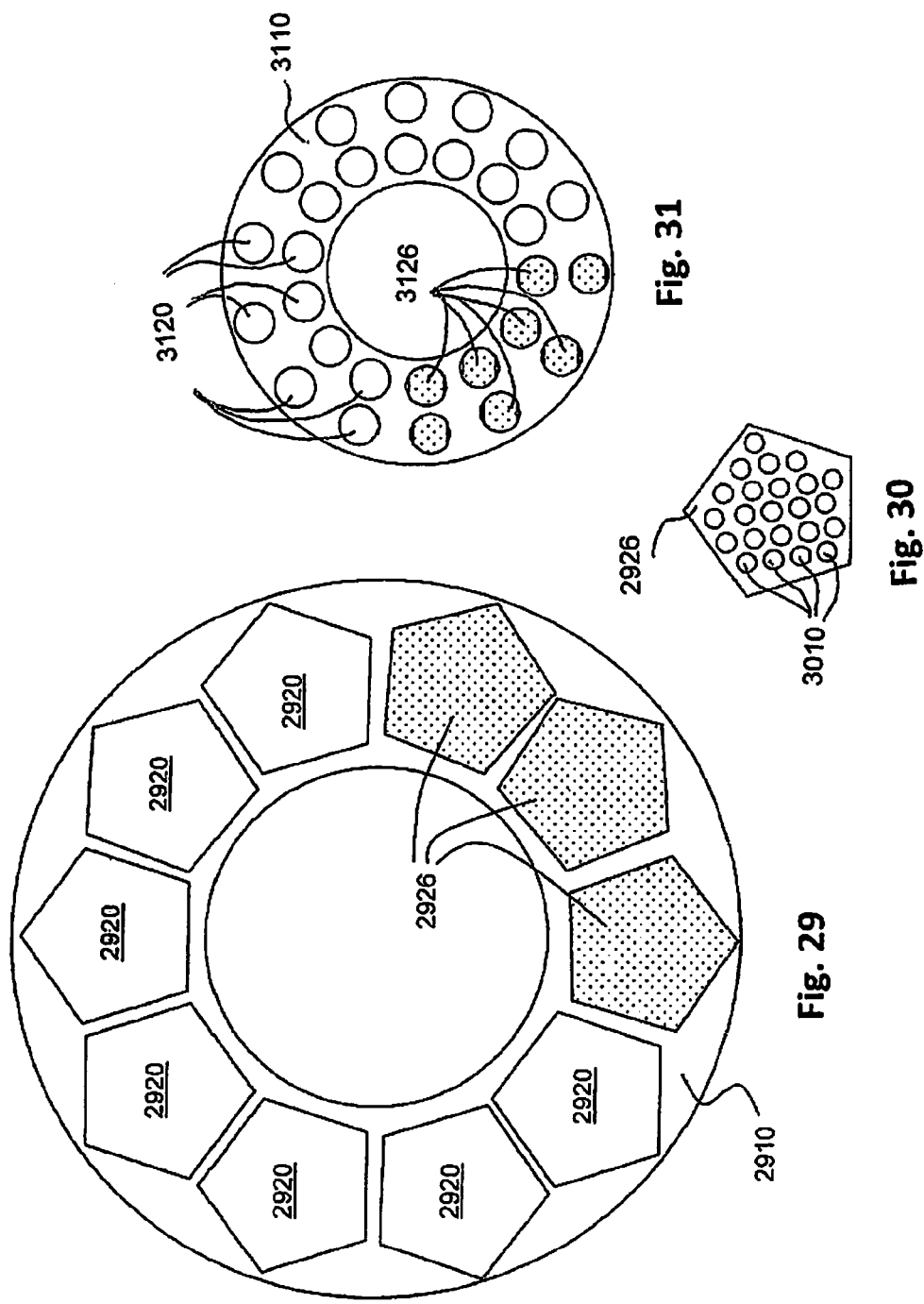

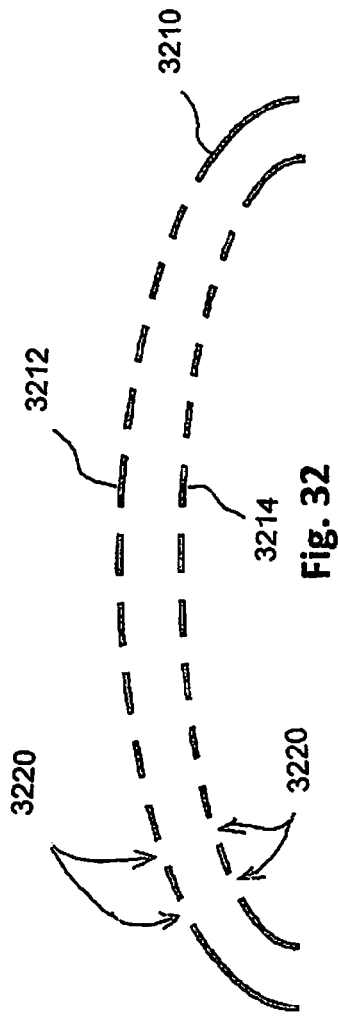
Fig. 32
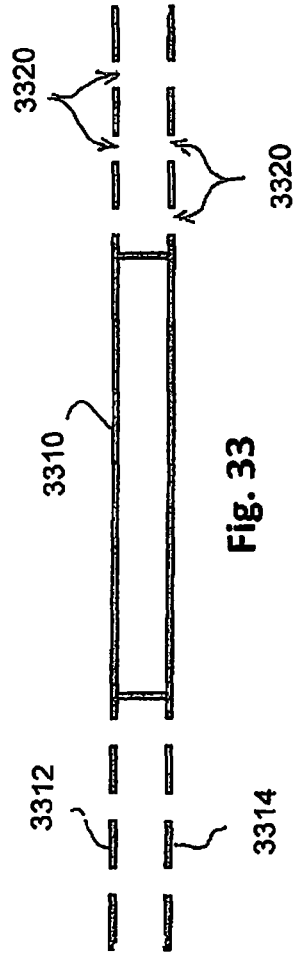
Fig. 33
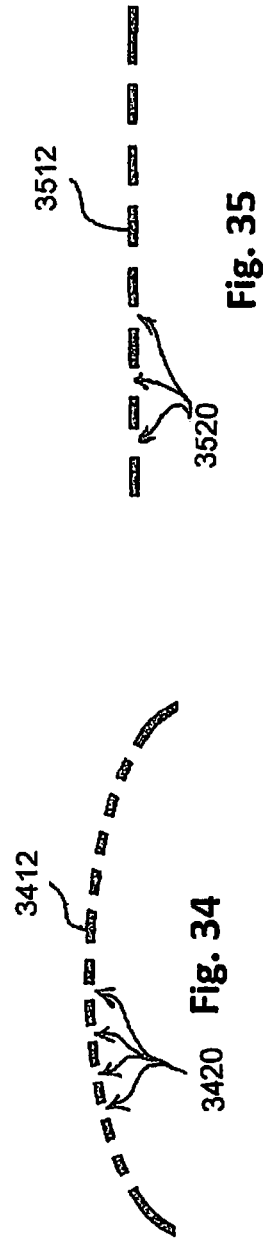
Fig. 35
Fig. 34

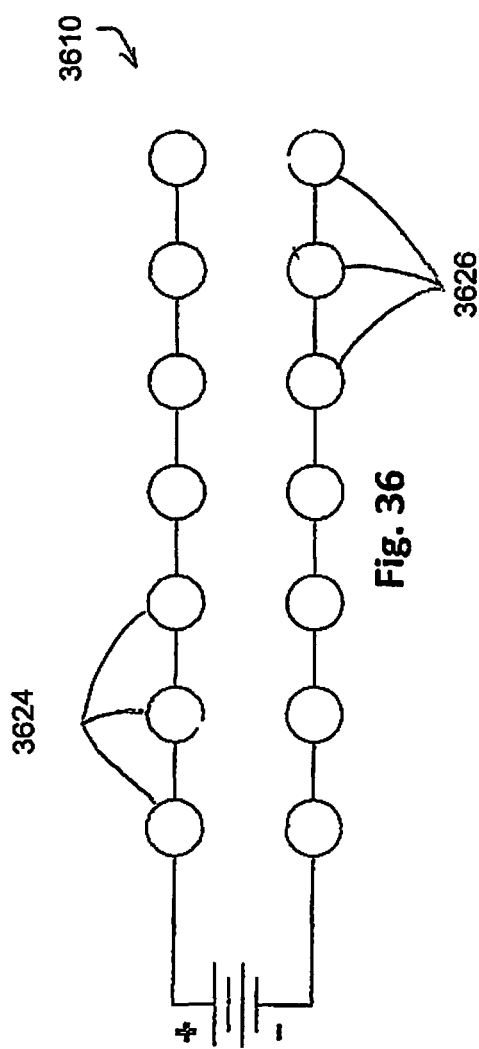

ION PROPULSION THRUSTER INCLUDING A PLURALITY OF ION OPTIC ELECTRODE PAIRS

CROSS-REFERENCE TO RELATED APPLICATIONS

This application is a continuation of U.S. patent application Ser. No. 13/713,907 filed Dec. 13, 2012, which is a continuation of U.S. patent application Ser. No. 12/894,565 filed Sep. 30, 2010, now U.S. Pat. No. 8,468,794, which claims the benefit of U.S. Provisional Application Ser. No. 61/295,326 filed Jan. 15, 2010.

ORIGIN OF THE INVENTION

The invention described herein was made by employees of the United States Government and may be manufactured and used by or for the Government for Government purposes without the payment of any royalties thereon or therefore.

BACKGROUND

Two general types of electric propulsion thrusters used in space include ion thrusters and Hall-effect thrusters.

Both ion thrusters and Hall-effect thrusters are 'electrostatic' electric propulsion devices used for spacecraft propulsion that create thrust by accelerating ions. The thrust created is very small compared to conventional chemical rockets, but a very high specific impulse, or high exhaust velocity, which reduces the propellant requirements for missions is obtained. This high 'propellant efficiency' is achieved through the very frugal propellant consumption of the electric propulsion system. They do however require large amounts of power; typically 1 kWe per 0.030-0.040 Newtons thrust for ion thrusters, and 1 kWe per 0.050-0.080 Newtons thrust for Hall-effect thrusters.

Ion thrusters and Hall-effect thrusters both generate a beam of ions (electrically charged atoms or molecules) to create thrust in accordance with Newton's third law. The method of accelerating the ions varies, but all designs take advantage of the charge/mass ratio of the ions. This ratio means that relatively small potential differences can create very high exhaust velocities. This reduces the amount of reaction mass or fuel required, but increases the amount of specific power required compared to chemical rockets. Electric propulsion thrusters are therefore able to achieve extremely high specific impulses.

The drawback of the low thrust is low spacecraft acceleration because the mass of current electric power units is directly correlated with the amount of power required. This low thrust makes electric propulsion unsuited for launching spacecraft into orbit, but they are ideal for in-space propulsion applications.

Gridded electrostatic ion thrusters commonly utilize xenon gas. This gas has no charge and is ionized by bombarding it with energetic electrons. These electrons can be provided from an electron source as a hot cathode filament, or more typically a hollow cathode assembly (HCA), which are then accelerated in the electrical field of the cathode fall to the anode (Kaufman type ion thruster).

The positively charged ions are extracted by an extraction system consisting of 2 or 3 multi-aperture grids. After entering the grid system via the plasma sheath the ions are accelerated due to the potential difference between the first and second grid (named screen and accelerator grid) to the final ion energy of typically 1-2 keV, thereby generating the thrust. Typical ion velocities are in the range of 20,000-50,000 m/s, and higher for some energetic mission applications.

In spacecraft propulsion, a Hall-effect thruster also accelerates ions by an electric field. Hall-effect thrusters trap electrons in a radial magnetic field and then use the electrons to ionize propellant, efficiently accelerate the ions to produce thrust, and neutralize the ions in the plume.

The essential working principle of the Hall-effect thruster is that it uses an electrostatic potential to accelerate ions up to high speeds but does so without the application of a gridded extraction system used in ion thrusters. In a Hall-effect thruster the attractive negative charge is provided by an electron plasma at the open end of the thruster instead of a grid. A radial magnetic field of a few tens of milli-Tesla is used to confine the electrons, where the combination of the magnetic field and an attraction to the anode upstream surface force a fast circulating electron current around the axis of the thruster and only a slow axial drift towards the anode occurs.

A propellant, such as xenon gas is fed through the anode, which has numerous small holes in it to act as a gas distributor. As the neutral xenon atoms diffuse into the channel of the thruster, they are ionized by collisions with high energy circulating electrons.

The xenon ions are then accelerated by the electric field between the anode and the cathode. The ions quickly reach speeds of around 15,000 m/s for a specific impulse of 1,500 seconds (15 kN·s/kg). Upon exiting however, the ions pull an equal number of electrons with them, creating a plume with no net charge. The axial magnetic field is designed to be strong enough to substantially deflect the low-mass electrons, but not the high-mass ions which have a much larger gyroradius and are hardly impeded. About 30% of the discharge current is an electron current which does not produce thrust, which limits the energetic efficiency of the thruster; the other 70% of the current is in the ions. The ionization efficiency of the thruster is thus around 90%.

The magnetic field thus ensures that the discharge power predominately goes into accelerating the xenon propellant and not the electrons, and the thruster turns out to be reasonably efficient.

Because of the counter-flowing electron and ion currents in the Hall-effect thruster channel, a greater ion flux can be achieved as compared to that of the ion thruster—thereby yielding higher thrust-to-power than ion thrusters. Ion thrusters however are capable of achieving higher exhaust velocities with higher overall thrust efficiencies.

BRIEF SUMMARY

It would be desirable in the propulsion field to provide an electric propulsion device that delivers the performance capabilities of high thrust-to-power devices (such as Hall-effect thrusters) and the high specific impulse of high total-impulse devices (such as electrostatic gridded-ion thrusters).

One limitation is that no single Electric Propulsion Thruster (EPT) exists which can operate over the full specific impulse range of interest and do so with the combined characteristics of both Hall-effect and ion thrusters, such as high Thrust-to-Power (T/P).

The design attributes of the Hall-effect thruster and the ion thrusters specific to their ion-acceleration systems: the Hall-effect thruster utilizes back streaming electrons accelerated from an external cathode toward an anode upstream of a radial-geometry magnetic field within an azimuthally-symmetric channel to generate a plasma and create counter-flowing accelerated ion current; and the ion thruster utilizes a closely-spaced multi-aperture electrodes (electrostatic 'ion optics') with a large applied E-field to focus and accelerate ions from a discharge plasma to form a (space-charge-limited)~mono-energetic beam.

DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Elements may not be drawn to scale and in some instances, cross-hatching is not shown to improve clarity. In particular, certain drawings may show features illustrated in exaggerated or out of scale with other features to improve understanding of concepts described.

FIG. 1 is a perspective view of selected components of an exploded, partially cut-away, electric propulsion machine.

FIG. 2 is a side view of ion optics.

FIG. 3 is a cross-sectional view taken along line 3-3.

FIG. 4 is a side cross-sectional view of an electric propulsion machine.

FIG. 5 is a top plan view, partially cut away, of an exemplary electric propulsion machine.

FIG. 29 is a plan form view of an annular ion optic frame with shaped receptacles.

FIG. 30 is a plan form view of a shaped ion optic electrode.

FIG. 31 is a plan form view of an annular ion optic frame with shaped receptacles.

FIG. 32 is a side cross-sectional view of a dome shaped ion optic frame.

FIG. 33 is a side cross-sectional view of a planar annular ion optic frame.

FIG. 34 is a side cross-sectional view of a dome shaped ion optic frame.

FIG. 35 is a side cross-sectional view of a planar ion optic frame.

FIG. 36 is a simplified electrical schematic of one set of electrical connections in a shaped ion optic electrode system.

DETAILED DESCRIPTION

Figure 6:
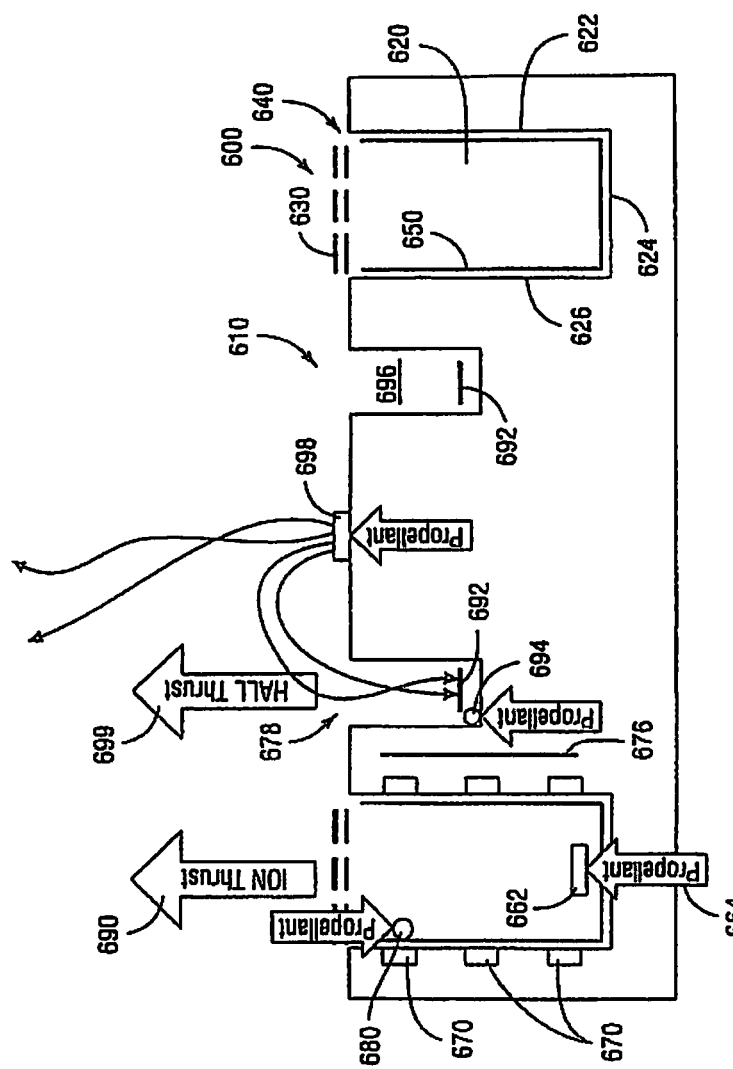
FIG. 6 is a side cross-sectional view of the electric propulsion machine shown in FIG. 5.

As used herein, the relevant design attributes of a Hall-effect and ion thrusters are their respective ion-acceleration systems: an azimuthally-symmetric channel with axial E-field and radial B-field for the Hall-effect thruster yielding closed-drift electrons to generate a plasma and create counter-flowing accelerated ion current; and closely-spaced multi-aperture electrodes or electrostatic ion optics with a large applied E-field to focus and accelerate ions from a discharge plasma to form a space-charge-limited mono-energetic beam for the ion thruster.

The plasma production and acceleration mechanisms of the Hall thruster are closely-coupled and are intimately connected to the geometric construction of the thruster discharge geometry.

On the other hand ion thrusters have de-coupled plasma production and acceleration mechanisms. As such, the thruster discharge geometry can be constructed in a variety of fashions without compromising the operational integrity of the ion thruster—so long as the acceleration mechanism, the electrode geometry, is maintained. An ion thruster discharge chamber may take a number of geometries—cylindrical, an oblate-spheroid, rectangular-box, etc. So long as there is a high degree of azimuthal symmetry to the ion thruster discharge geometry, a magnetic circuit can be designed to contain the discharge plasma that will yield a high discharge electrical efficiency. This is particularly true when the thruster is operated at high plasma densities. Maintaining high discharge electrical efficiency is an important consideration when trying to improve thrust to power (T/P)-ratio and overall thruster efficiency.

In a first embodiment illustrated in exploded and partially cut away FIG. 1, an electric propulsion machine includes an ion thruster 100 comprising an annular discharge chamber 110 and annular ion optics 120 covering an exhaust annulus 130. The ion thruster further includes a centrally-mounted neutralizer cathode 140 all arranged along a common axis A. Off axis A, but disposed within the annular discharge chamber 110, an exemplary ion thruster further includes at least one discharge cathode 150 and a propellant source 160 together forming a discharge cathode assembly 170. As further discussed below, an anode (not shown) is disposed within the annular discharge chamber 110.

It is appreciated that the ion optics 120 are shown "exploded" from the exhaust annulus 130. The ion optics 120 may be configured as a set of parallel annular electrodes having an outer radius 180 substantially conforming to an outside edge of the ion thruster 100. The ion optics further are defined by an inner radius 182 selected to ensure the exhaust annulus is covered by the ion optics 120. A distance or span 190 is defined between the outer radius 180 and the inner radius 182. Moreover, ion optics 120 include closely-spaced apertures 122, usually circular, through the thickness which are aligned between the electrodes. In one example, on the outer most electrode, the apertures are 0.075" diameter, with 0.093" center-to-center spacing in a hexagonal array, so the electrode has a very high open area fraction. Using the example, across any 1-inch span there are ~10 apertures.

With reference now to FIGS. 1 and 2, a side view illustrates that the ion optics 120 may include a set of two parallel, substantially planar annular electrodes, 210, 220. The electrodes are spaced apart by a substantially uniform gap 230. In an embodiment the electrodes 210, 220 comprise flat pyrolytic graphite ion optics.

With reference now to FIG. 3, a top-down, cross-sectional view taken along III-III of FIG. 1, illustrates one embodiment of a plurality of discharge cathode assemblies 170 distributed about a closed end 310 of the annular discharge chamber 110 opposite of the exhaust annulus. Propellant channel 320 provides a path of fluid communication to the neutralizer cathode 140. In another embodiment, the discharge chamber may be defined by a cylindrical shape 350 on an exterior side and a conic shape (not shown) on the interior producing a chamber of linearly increasing or decreasing annular, cross-sectional spans between the closed end to the exhaust annulus.

With reference now to FIG. 4, cross-sectional, side view of an exemplary electric propulsion machine configured as an ion thruster 400 shows an annular discharge chamber 410 and annular ion optics 420 covering an exhaust annulus 430. The ion thruster 400 further includes a central cylinder 440 defining an interior surface 442 of the annular discharge chamber 410. The interior surface may be configured with magnetic shielding 472 to create a field-free region along the central core. Opposite the exhaust annulus 430, the discharge chamber 410 terminates in a closed annular end 444. An outermost surface 446 opposes the interior surface 442 and together, interior surface 442, closed end 444 and outermost surface 446 define the discharge chamber 410.

An anode 450 may be operatively disposed within and electrically insulated from the discharge chamber 410. In the illustrated embodiment, the anode 450 is electrically isolated and disposed along the interior surface 442, closed end 444 and outermost surface 446. Such an anode 450 provides additional surface area when compared to an anode disposed along only a single surface, for example the outer surface. As more completely described below, the added surface area improves electrical characteristics of the engine. Ion thruster 400 is further illustrated with a discharge cathode assembly 460 to generate a discharge plasma, the cathode assembly including a cathode 462 and propellant feed 464. Rare earth permanent magnets 470 are embedded within or formed integrally with the interior surface 442 and outermost surface 446 to establish a boundary magnetic circuit, of ring-cusp, or line-cusp geometry, to contain and control the energetic electrons emitted from the cathode assembly 460 to create an efficient plasma. Although only illustrated partially on a single side of the chamber 410, it is understood that the magnets 470 line the surfaces 442, 446. At least one ion plenum 480 is disposed toward the exhaust annulus 430 to provide a second, and primary, propellant feed.

One advantage of the illustrated ion thruster 400, as compared to ion thrusters of conventional configuration (cylindrical discharge with spherically-domed circular ion optics), includes the annular discharge chamber being able to provide for efficient packaging by providing a central position for mounting the neutralizer cathode assembly (NCA) 486 within the annulus. This reduces the outer profile of the engine and eliminates the need for a cantilevered-outboard NCA employed on conventional ion thrusters.

Another advantage of the illustrated ion thruster 400 includes the annular-geometry ion optics allowing for scaling of ion thrusters to very high power by permitting very-large beam areas with relatively small electrode spans, and relatively small span-to-gap ratios. This reduces the manufacturing, and the mechanical and thermal stability issues inherent with attempting to increase the beam area via increasing the diameter of spherically-domed ion optics as on conventional cylindrical ion thrusters.

Another advantage of the illustrated ion thruster 400 includes the annular-geometry ion optics allowing for the application of flat ion optics electrodes. Flat electrodes improve thrust to power (T/P)-ratios and efficiencies as compared to conventional ion thrusters by substantially reducing or eliminating the off-axis beam vectoring of ions which occurs with spherically-domed ion optics electrodes.

Another advantage of the illustrated ion thruster 400 includes the annular-shaped discharge chamber providing an opportunity to increase the effective anode-surface area for electron-collection as compared to a conventional cylindrically-shaped ion thruster of equivalent beam area. This allows the illustrated engine to operate at the full-capability of the ion optics, and not have its maximum input power level limited by the available anode surface area. This increase in anode surface area allows the engine to operate at higher discharge currents and therefore higher beam currents and input power levels than a conventional ion thruster of equivalent beam area for a given specific impulse. Alternatively, for the same input power, the increased anode surface area associated with this annular geometry allows the engine to include a smaller outside diameter than a conventional ion thruster.

For example, the NEXT ion thruster (nominal 40 cm beam diameter) has a beam area of approximately 1257 $cm^2$, and a discharge chamber anode area of approximately 3334 $cm^2$. An engine according to the teachings here permit a smaller diameter (comparable to that of the 30 cm diameter NSTAR ion thruster) yielding a comparable discharge chamber anode area of approximately 3336 $cm^2$, using an outside annular discharge chamber diameter of only 31 cm and an inside annular discharge chamber diameter of 6 cm (inside which a neutralizer cathode assembly may be contained). As detailed in Table 1, an annular discharge chamber engine may support an annular beam area of about 727 $cm^2$ which is sufficient to support operation of the engine at the full-power operating power of the larger NEXT thruster—3.52 A beam current and 6.86 kWe. Such an engine would have a much reduced optics span, and optics span-to-gap ratio as compared to the NEXT ion thruster.

TABLE 1

| | Engine | |
|---|---|---|
| Attribute | Conventional EPT NEXT Ion Thruster | Annular Engine |
| Beam Diameter, cm | 40.0 | 31.0 |
| Beam Area, cm$^2$ | 1257 | 727 |
| Discharge Chamber Anode Surface Area, cm$^2$ | 3334 | 3336 |
| Anode Surface Area to Beam Area | 2.56:1 | 4.59:1 |
| Optics Span, cm | 40.0 | 12.5 |
| Optics Span-to-Gap Ratio | 606:1 | 189:1 |

In operation an annular thruster channels propellant flow through the discharge cathode assembly (DCA) 460, the ion plenum 480, and the central common NCA 486. As discussed more completely below, an Ion Anode Power Supply, an Ion Beam Power Supply and an Ion Accelerator Electrode Power Supply are all energized. Operating range would be typically 2000-5000 seconds specific impulse.

With reference now to FIG. 5, in another embodiment, a dual electric propulsion machine includes an ion thruster 500 comprising an annular discharge chamber 505 underlying ion optics 510 and a second thruster 520, illustrated and described here as a Hall-effect thruster. In this illustration an ion thruster 500 including an annular-shaped discharge chamber and annular-shaped ion optics 510 are mounted circumferentially around the exterior of a second thruster 520, a Hall-effect thruster arranged on a common axis and a centrally-positioned neutralizer cathode 540 common to both the ion and Hall-effect plasma sources.

Referring now to FIG. 6, a cross-sectional, side view of the exemplary dual electric propulsion machine shown in FIG. 5 includes an annular ion thruster component 600 surrounding a central, second electric propulsion thruster component configured as a Hall-effect thruster 610. The annular ion thruster 600 includes an annular discharge chamber 620. The annular discharge chamber 620 is defined by an outer surface 622, a closed annular end 624 and an interior surface 626 that may be configured with magnetic shielding to magnetically shield the NCA from the magnetic circuit of the ion thruster and Hall-effect components 600, 610. The annular ion thruster 600 further includes annular ion optics 630 covering an exhaust annulus 640, and an anode 650 operatively disposed within and electrically insulated from the discharge chamber 610. While the illustrated anode 650 is configured to maximize surface area by occupying substantially the surface area of the outer surface 622, the closed end 624 and the interior surface 626, alternately structured anodes may occupy less of the interior space of the annular discharge chamber 620 depending on electrical and power requirements.

The annular ion thruster 600 is further illustrated with a discharge cathode assembly 660 to generate a discharge plasma, the cathode assembly including a cathode 662 and propellant feed 664. Permanent magnets 670 are embedded within the outer wall 622 and interior wall 626. As above, the magnets are only illustrated partially, it is understood that the magnets 670 may be annularly disposed within the walls 622, 626, or discreet magnets may be spaced around the discharge chamber 620 and/or spaced between the exhaust annulus 640 and the end 624. Additionally, at least one ion plenum 680 is disposed near the exhaust annulus 640 side of the chamber 620 to provide a second propellant feed. In operation, the annular ion thruster 600 provides thrust from the exhaust annulus 630 as indicated by the arrow 690 although it is appreciated that thrust is provided from all or substantially all of the exhaust annulus 640.

With continued reference to FIG. 6, the Hall-effect thruster component 610 may include a separate anode 692 and plenum 694 to supply propellant to the Hall closed drift channel 696 having a radial magnetic field and axial electric field to generate plasma and create counter flowing accelerated ion currents. Electron trajectories are illustrated by arrows emanating from a common neutralizer cathode 698 and thrust is illustrated by arrow 699 but understood to be distributed around the Hall-effect component 610.

In one embodiment, a dual electric propulsion machine provides for efficient packaging to minimize overall engine diameter.

In one embodiment of a dual electric propulsion machine using a Hall-effect thruster component 610 as the second propulsion engine, maintains the design integrity of the Hall-effect thruster to ensure its performance characteristics of high TIP-ratio at low specific impulse;

A centrally-located neutralizer cathode assembly (NCA) 698 may provide dual functionality as both the discharge plasma generation and beam neutralization for the Hall-effect component 610, and beam neutralization for the ion thruster component 600. Additionally, a centrally located NCA 698 may reduce the outer profile of the engine and eliminate the need for a cantilevered-outboard NCA (not shown) dedicated for the operation of the ion thruster.

The annular-geometry ion optics 630 allow for very-large beam areas while creating very small electrode spans, and very small span-to-gap ratios. This permits use of flat ion optics electrodes. Flat electrodes yield improved T/P-ratios and efficiencies as compared to current ion thrusters. This is because conventional ion thrusters are cylindrical in geometry, requiring spherically-domed ion optics electrodes to ensure both adequate stiffness for launch vibration, and thereto-mechanical stability under thermal loads during operation to maintain a uniform, controlled inter-electrode gap over very-large spans. The domed electrodes however result in thrust-losses associated with beamlets directed off-axis. Reducing thrust-losses associated with off-axis beam vectoring by using flat electrodes result in an improvement in overall efficiency for a given input power as more completely described below.

The annular-shaped discharge chamber 620 of the ion component 600 of the dual electric propulsion machine increases the effective anode-surface area for electron-collection as compared to a conventional cylindrically-shaped ion thruster of equivalent beam area. This allows the ion thruster component 600 to operate utilizing the full-perveance capability of the ion optics 630, and not have its maximum input power level limited by the available anode surface area. This increase in anode surface area allows the ion component to operate at higher discharge currents and therefore higher beam currents and input power levels than current ion thrusters of equivalent beam area for a given specific impulse. This increase in input power capability will be more completely described below.

The increase in operable surface area due to expanded surface available in the annulus also creates more radiative surface, permitting operation at higher discharge power levels as compared to a comparable beam area thruster of conventional construction. This is expected to maintain acceptable temperature margins on critical components such as the rare-Earth permanent magnets.

Geometric differences in ion optics electrodes 630, and discharge chamber anode surface areas as compared to conventional ion thrusters are documented in Tables 2 and 3 respectively. For purposes of illustration, the center core, or second thruster of the dual thruster engine is assumed to be a NASA GRC 300M Hall-Effect thruster in this embodiment. The 300M is a 20 kW-class laboratory electric propulsion thruster with an external diameter of 15⅜" (39 cm).

Dual thruster engines with an ion thruster beam area equivalent to a conventional cylindrical ion thruster are listed in Table 2. As noted the dual thruster engine approach allows for a dramatic reduction in optics span, and span-to-gap ratio for a given beam area. Specifically, in one example, a 4-6× reduction in span and span-to-gap ratios. This comparatively small span is expected to result in a first-mode natural frequency high enough to allow for the use of flat electrodes. This in combination with the application of a long-life, low thermal coefficient-of-expansion material such as pyrolytic-graphite for the electrodes will provide an optimal flat-electrode design solution which is expected to eliminate the thrust-losses inherent with a domed electrode geometry used in conventional ion thrusters.

TABLE 2

| | Engine | | | | | |
|---|---|---|---|---|---|---|
| Optics | Conventional EPTs | | | Dual Thruster Engine | | |
| Attribute | NSTAR | NEXT | 50 cm | A | B | C |
| Area, $cm^2$ | 625 | 1257 | 1963 | 625 | 1257 | 1963 |
| Span, cm | 28.2 | 40.0 | 50.0 | 4.56 | 8.43 | 12.2 |
| Span-to-Gap Ratio | 427:1 | 606:1 | 757:1 | 69:1 | 128:1 | 185:1 |

The differences in anode surface areas between conventional electric propulsion thrusters (Ion thrusters: NSTAR and NEXT are partial-conic; 50 cm is cylindrical) and the annular-portion (ion component) of the dual thruster engine having an equivalent beam area are documented in Table 3 (assuming a core of a 300M Hall-Effect thruster component). As noted, the dual thruster engine yields a much larger anode surface area for an equivalent beam area; e.g. ~2.4× increase in area as compared to the NEXT ion thruster. It should be noted that these calculations are based on the increase in geometric surface area of the anode. For ring-cusp magnetic circuit plasma discharges the actual effective anode surface area is the sum of the magnetic cusp lineal areas. While estimated, the surface area ratios documented in Table 3 should be reasonably accurate.

TABLE 3

| | Engine | | | | | |
|---|---|---|---|---|---|---|
| | Conventional EPTs | | | Dual Thruster Engine | | |
| Attribute | NSTAR | NEXT | 50 cm | 'A' | 'B' | 'C' |
| Beam Area, $cm^2$ | 625 | 1257 | 1963 | 625 | 1257 | 1963 |
| Discharge Chamber Anode Surface Area, $cm^2$ | 2138 | 3334 | 5490 | 6776 | 7954 | 9192 |

TABLE 3-continued

| | Engine | | | | | |
|---|---|---|---|---|---|---|
| | Conventional EPTs | | | Dual Thruster Engine | | |
| Attribute | NSTAR | NEXT | 50 cm | 'A' | 'B' | 'C' |
| Anode Surface Area to Beam Area | 3.42:1 | 2.65:1 | 2.80:1 | 10.84:1 | 6.33:1 | 4.68:1 |
| Ratio of Dual Thruster Engine-to-Conventional EPT Anode Area | | | | 3.17:1 | 2.39:1 | 1.67:1 |

The comparatively-large surface area of the dual thruster engine anode compared to either beam area alone or anode area of conventional EPT's of the same or similar beam areas allows for operation at higher discharge currents. This enables operation at much higher power levels, thereby taking full-advantage of the current-extraction capability (perveance) of the ion optics.

Several other design features and attributes of embodiments of the dual thruster-engine are noted here, with continued reference to FIG. 6.

The Hall-effect component 610 of the dual thruster engine may be of conventional construction, using a solenoid electromagnet (not shown) to create the appropriately-shaped radial magnetic field at the exit plane of the channel. Use of a centrally-located cathode 698 and implementation of the extensible-channel concept (to enhance life time) employed on the NASA GRC HiVHAC low power Hall-effect thruster may be used in the dual thruster.

A ring-cusp magnetic circuit is shown within the annular ion discharge chamber 620, created by rows of alternating-polarity rare-Earth permanent magnets 670 attached or embedded within the surfaces of the annular discharge chamber surfaces 622, 626. Magnetic shielding 676 may be added between the exterior of the Hall-effect discharge 678 and the ion exhaust annulus 640 to separate the magnetic circuits of the two discharges. Alternately, it may be possible to use the fringe-magnetic field created by the Hall-effect discharge solenoid magnet—which would naturally penetrate into the annular ion discharge chamber 620 without shielding—and shape it by appropriate application of magnetic materials within the walls of the annular ion discharge chamber 620 to generate and control the discharge plasma in this zone. This would be with the potential benefit of reduced mass by elimination of the rare-Earth permanent magnets 670.

The annular discharge chamber 620 of the ion thruster component 600 may include a conventional discharge cathode assembly (DCA) 662 to generate the discharge plasma.

Typical ion thrusters require 3 separate propellant feeds; a Hall-effect thruster 2 propellant feeds. In one embodiment a dual thruster uses a total of 4 separate propellant feeds: one each for the ion discharge 680 and Hall discharge 694; one for the ion DCA 664; and one for the central common NCA 698.

The annular discharge chamber 620 of the ion thruster component 600 may use a 'reverse-feed' plenum which may inject the propellant from the ion optics-end of the discharge backwards, giving it an initial axial velocity component resulting in an increased neutral atom residence time and improved propellant efficiency.

The dimensions of the channel width and depth of the Hall-effect component 610 would be defined by the intended operating power level(s).

The annular area of the ion optics 630 would be established by the intended operating power level(s), which would then establish the electrode span (and discharge channel width) and overall dual thruster outside diameter.

The depth of the annular ion component discharge chamber 620 may include a tradeoff of electrical and propellant efficiencies, maximum desired input power, and overall dual thruster mass. It may be, for example, most effective mechanically and magnetically to match the channel depths of the ion thruster component 600 and the Hall-effect component 610.

Figure 7:
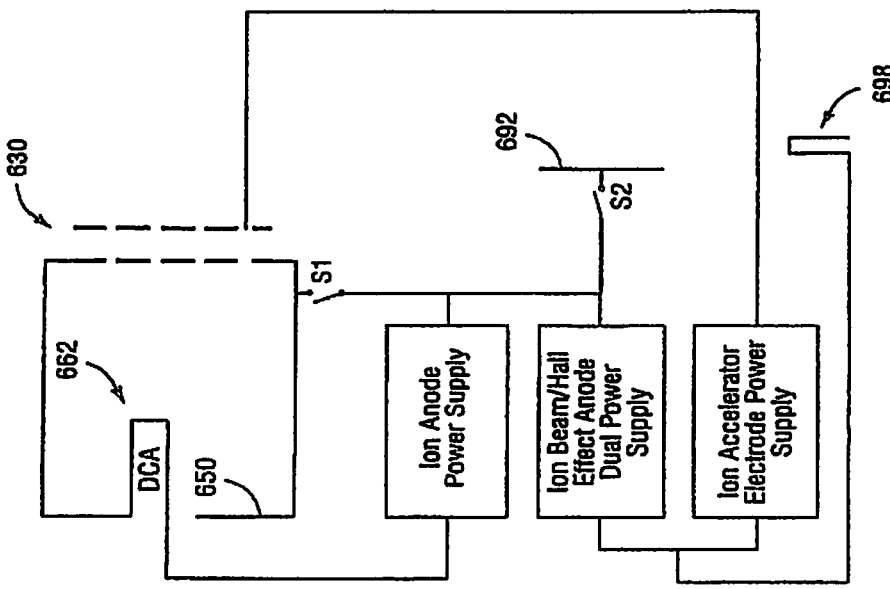
FIG. 7 is a simplified electric power circuit for an electric propulsion machine.

With reference now to FIG. 7, a simplified electrical diagram for a dual thruster is shown. Of note is that sufficient commonality exists in the requirements associated with the ion thruster component 600 beam power supply and the Hall-effect component 610 anode power supply that this function could be performed by a common power converter.

Figure 8:
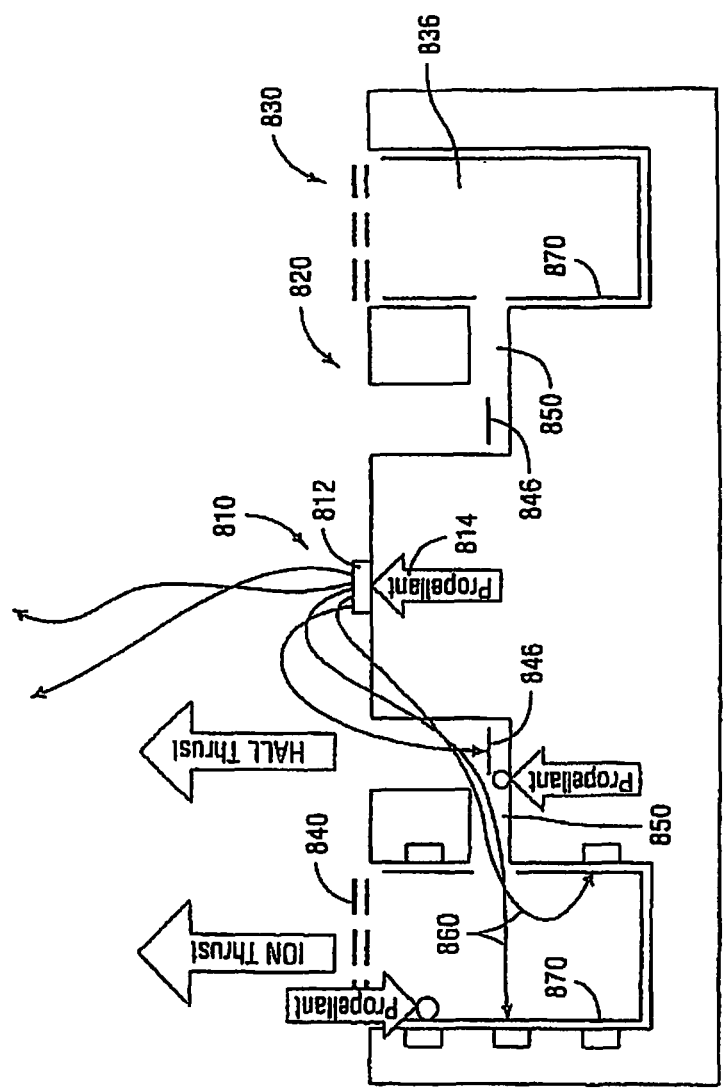
FIG. 8 is a side cross-sectional view of an alternate manifestation of an electric propulsion machine.

With reference now to FIG. 8, in another embodiment of the dual thruster, it may be advantageous to eliminate the DCA, and rely on the central common NCA 810 for plasma generation and beam neutralization of both the Hall-effect thruster component 820 and ion thruster component 830 of the dual thruster. Such a device may comprise one hollow cathode emitter 812 and propellant feed 814, reducing the total propellant feeds for the engine from 4 to 3.

One additional advantage to this approach is to eliminate the asymmetry in the ion thruster component 830 created by a singular discharge cathode assembly within an annular-shaped discharge chamber 836. This asymmetry could cause a (minor) asymmetry in the plasma at the plane of the ion optics 840, and also result in a (minor) asymmetry in the magnetic circuit ('a hole') in the area of the DCA resulting in an increase in discharge electrical losses.

In the same manner that the discharge plasma is generated for the Hall-effect component, namely electron-backstreaming of current from the NCA 810 to the Hall-effect anode 846, it is expected that a discharge plasma for the ion thruster component 830 may be generated similarly. In the embodiment illustrated in FIG. 8, radial slots 850 are provided around the circumference of the exterior of the Hall-effect component 820 to provide a passage to the annular-shaped discharge chamber 836 for neutrals, ions, and energetic electrons.

By appropriate shaping of the magnetic field in the passage (e.g.—axial B-field component across the radial slots) and de-energizing the Hall-effect solenoid (not shown) creating the downstream radial B-field component in the Hall channel, it should be possible to back-stream electrons 860 from the NCA 810, through the radial slots 850 toward the ion discharge anode 870 and in the process deplete their energy and use them efficiently to generate the ion thruster discharge plasma. The location of electron current collection and hence which discharge is operated (Hall-effect or ion) could be controlled by the switches identified in FIG. 7 and by the propellant flow rates through the respective plena. Alterations are available to artisans to optimize the magnetic field of the ion discharge may be accomplished to meet design constraints.

Figure 9:
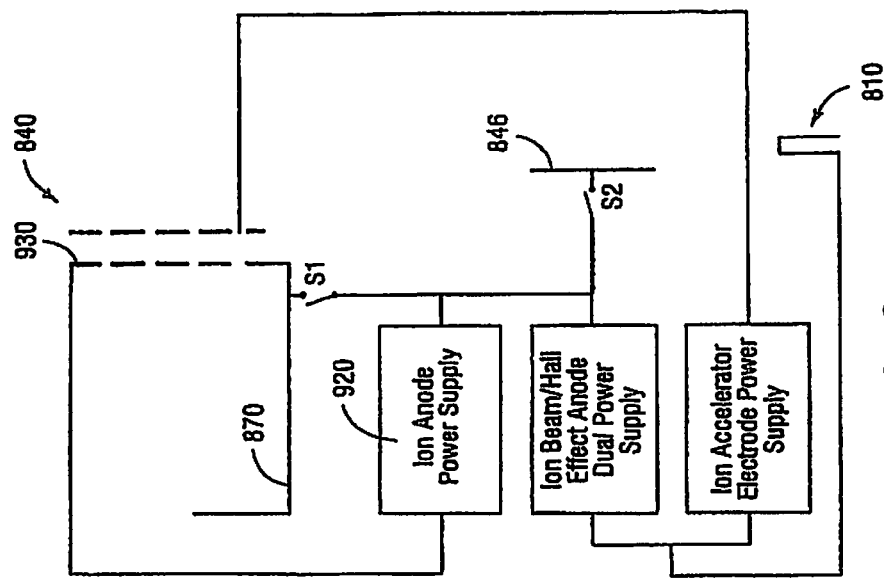
FIG. 9 is a simplified electric power circuit for an electric propulsion machine.

With reference now to FIG. 9, a simplified electrical schematic for a dual thruster embodiment having a single, central neutralizer cathode assembly 810 is shown. Although there is no longer a separate DCA discharge, the ion anode power supply 920 remains to provide a bias voltage to the screen electrode 930 of the ion optics 840.

Figure 10:
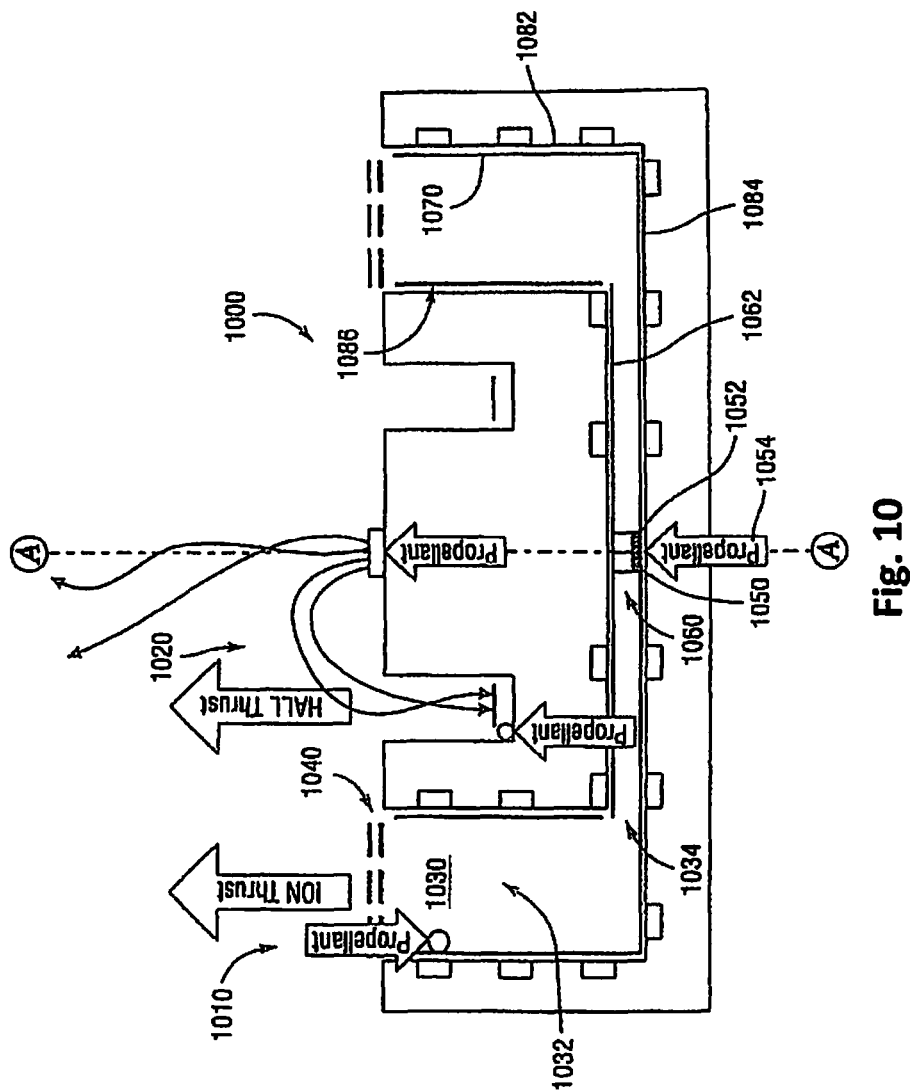
FIG. 10 is a side cross-sectional view of an alternate manifestation of an electric propulsion machine.

With reference now to FIG. 10, in yet another embodiment, a dual engine thruster 1000 includes an ion thruster component 1010 and a Hall-effect component 1020. While similar in many respects to the embodiments above, one distinction lies in the ion discharge chamber 1030 and an attempt to eliminate asymmetries caused by off-axis discharge cathode assemblies in the annular discharge chamber. Specifically, discharge chamber 1030 includes an annular section 1032 and a cylindrical section 1034. Annular section 1032 is bordered on one side by the exhaust annulus 1040 and by the cylindrical section 1034 on the opposing side. Desirably, a single discharge cathode assembly 1050 including cathode 1052 and propellant feed 1054 lies on central axis A. To support the Hall-effect component 1020, a mechanical support 1060 is provided, although it is appreciated that other supports in addition to the illustrated mechanical support could be interchanged. Supporting floor 1062 of mechanical support 1060 is insulated from the annular ion anode (discussed below) and is held at cathode potential.

The illustrated embodiment includes an annular ion anode 1070 of potentially greater surface area permitting higher currents and desirable features as described above. In the embodiment shown, annular ion anode 1070 lines but is insulated from an exterior surface 1082, a bottom 1084 of the cylindrical section, and an interior surface 1086.

Figure 11:
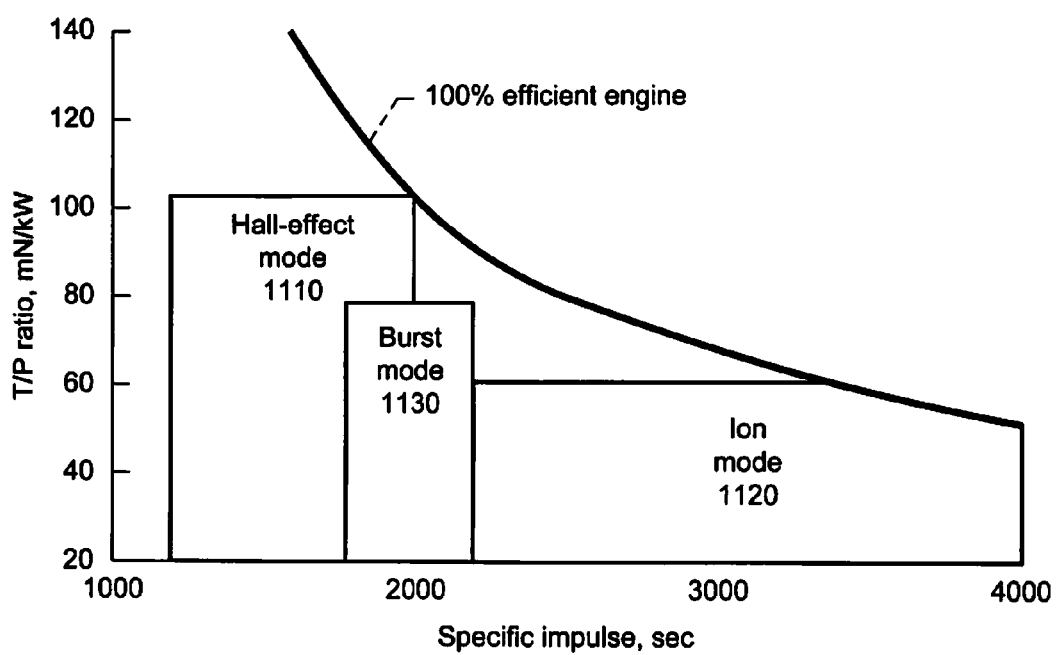
FIG. 11 is a chart illustrating operating modes of an exemplary electric propulsion machine.

As described in the embodiments above, a dual thruster is anticipated to have certain operational and performance characteristics. For example, a dual thruster can be operated in multiple 'modes.' Referring now to FIG. 11, in a 'Hall-effect mode' 1110 the propellant flow is channeled through the Hall plenum and the central common NCA. The solenoid to generate the radial magnetic field component and the Ion Beam/Hall-Effect Anode Dual Power Supply are energized. S1 switch is open, and S2 switch is closed. The Hall-effect component of the dual thruster is then operated as a conventional Hall thruster. Operating range would be typically 1200-2000 seconds specific impulse as seen at 1110.

As another example, the dual thruster can be operated in an 'ion mode' 1120 where the propellant flow is channeled through the ion plenum, the DCA, and the central common NCA. The Ion Anode Power Supply, the Ion Beam/Hall-Effect Anode Dual Power Supply, and the Ion Accelerator Electrode Power Supply are all energized. S1 switch is closed, and S2 switch is open. The ion component of the dual thruster is then operated as a conventional ion thruster. Operating range would be typically 2000-4000 seconds specific impulse as seen at 1120.

In yet another example, the dual thruster can be operated in a 'burst mode' 1130 where the propellant flow is channeled through all 4 locations, all power supplies are energized, and both S1 and S2 switch are closed. The Hall-effect and ion components of the dual thruster are then both operated simultaneously. Operation would be typically in the 1800-2200 seconds specific impulse range, in a zone where both components are capable of functioning with some overlap in capability 1130. This mode is theoretically possible but may not be operationally advantageous. However, two potential reasons for operating in this burst mode include: (a) Providing a seamless-transition in specific impulse throttling between Hall-effect mode 1110 and ion mode 1120 operation; and (b) assuming there is sufficient capability in the power electronics and propellant management system, operating at a total input power and generating a total thrust level for the dual thruster exceeding that which could be achieved by either the Hall-effect or ion components alone.

As mentioned above in discussing the annular discharge chamber ion thruster, when the dual thruster is operated in ion mode 1120 higher efficiencies at fixed input power, and higher input power at fixed specific impulse are possible, as compared to conventional ion thrusters. For example, the flat-geometry of the ion optics electrodes afforded by the annular design will improve the efficiency of the thruster as compared to a conventional ion thruster of equivalent beam area. This is because the thrust-losses associated with beam divergence due to the domed shape of conventional ion thrusters are eliminated in the annular design.

Moreover, both the specific impulse and the thrust are proportional to the thrust-loss correction factor due to off-axis beam vectoring ($F_t$); hence the overall thruster efficiency, which includes the specific impulse and thrust terms, is proportional to $F_t^2$. The correction $F_t$ includes both the beam divergence due to the electrode dome shape $F_{t-d}$ and beam divergence due to beamlet expansion $F_{t-b}$.

From equation 9 of Soulas, G. C., "Design and Performance of 40 cm Ion Optics," the NEXT ion thruster optics (dome height of approximately 2.35 cm and chord of 18 cm) $F_{t-d}$ is estimated to be approximately 0.983. Hence, the reduction in thrust and specific impulse, and overall thruster efficiency of the NEXT ion thruster due to off-axis beam vectoring caused by the domed ion optics is expected to be 0.017, or −1.7% $\{100*(F_{t-b}-1.00)\}$ in thrust and specific impulse, and 0.034, or −3.4% $\{100*(F_{t-b}^2-1.00)\}$ in efficiency at all throttle conditions. Therefore, all else being equal, for an equivalent beam area dual thruster with flat ion optics ($F_{t-d}$ equal to 1.00), a 3.4% increase in efficiency as compared to the NEXT ion thruster would be expected across the entire specific impulse range as seen below:

TABLE 4

| Throttle level/Input Power Level, kW | Thruster | | | | | |
|---|---|---|---|---|---|---|
| | NEXT-STEP & NEXT | | | Annular Ion Thruster | | |
| | T/P-ratio, mN/kW | Specific Impulse, sec | Efficiency | T/P-ratio, mN/kW | Specific Impulse, sec | Efficiency |
| —/2.498 | 60.8 | 1711 | 0.499 | 61.8 | 1740 | 0.516 |
| —/3.658 | 54.9 | 2240 | 0.601 | 55.8 | 2277 | 0.621 |
| —/4.818 | 50.0 | 2666 | 0.655 | 50.8 | 2711 | 0.677 |
| TL23/2.816 | 42.2 | 3090 | 0.640 | 42.9 | 3142 | 0.662 |
| TL25/3.683 | 37.8 | 3616 | 0.670 | 38.4 | 3676 | 0.693 |
| TL12/2.439 | 32.9 | 3999 | 0.645 | 33.4 | 4066 | 0.667 |
| TL40/6.860 | 34.5 | 4188 | 0.708 | 35.1 | 4258 | 0.732 |

One of the design issues with the NEXT thruster, and other conventional partial-conic or cylindrical discharge chamber ion thrusters (such as the NSTAR ion thruster, or the NASA GRC 50 cm laboratory model ion thruster), is that they cannot take full advantage of the ion current extraction capability of the ion optics technology—and hence operate at-or-near their maximum theoretical input power capability.

The NEXT neutralizer cathode, discharge cathode, magnets, ion optics, and high voltage propellant isolators all have adequate thermal and/or operational margins for operation at extremely-high input power levels; well in excess of the 7 kW maximum input power of the NEXT throttle table. Additionally, conventional NEXT ion optics are capable of operating at beam currents well-in-excess-of the maximum 3.52 A of the NEXT throttle table; >>7.0 A beam currents at full total voltage (2010 V). Application of advanced high-perveance design ion optics to the NEXT thruster would allow for operation at beam currents >>7.0 A at low total and beam voltages, thus enabling truly-high Thrust-to-Power operation.

Unfortunately, although operation at these high beam currents is consistent with the ion extraction system electrostatic functionality, they require a maximum sustainable discharge current which exceeds that which can be supported by the available anode surface area of the NEXT thruster discharge chamber. The maximum sustainable discharge current for the NEXT thruster is estimated to be in the range of about 32-35 Amperes, yielding a maximum beam current of about 7.0 A.

As documented in Table 3, for a given beam area, implementation of the annular discharge chamber either in a dual thruster arrangement or as a stand-alone annular ion thruster increases the effective and available anode surface area, as compared to conventional ion thrusters. The larger anode surface area increases the permissible sustainable discharge current and therefore beam current and thruster input power for a given beam voltage (specific impulse). The increase in sustainable discharge current (and approximate equivalent increase in beam current and input power) will be either directly proportional to the increase in anode surface area—or—will be equal to the discharge current necessary to support the maximum perveance-limited beam current that the ion optics are capable of extracting, whichever is less.

For an ion thruster with beam area equivalent to that of the NEXT ion thruster, an increase in anode surface area of 2.4× is possible. This permits an increase in sustainable discharge current and increase in beam current and thruster input power for a given beam voltage (specific impulse).

The increase in input power for a dual thruster versus a NEXT ion thruster of equivalent beam area is documented in Table 5 for a range of specific impulse. As indicated in Table 5 the input power to the NEXT ion thruster is limited by the anode-area down to about 3340 seconds specific impulse. Below this level, both the anode-area and the ion optics current-extraction-capability limit the thruster input power.

The annular ion and dual thruster is also anode-area limited at high specific impulse (4430 seconds); the ion optics are capable of supporting >20 A beam current, which would require a discharge current of greater than 84 Amperes. Although at this specific impulse the engine is anode-area limited, the maximum input power and thrust for this engine are 2.4× higher than that feasible with the equivalent-beam area NEXT thruster, due to the larger anode area of the dual thruster. At 4140 seconds specific impulse and below the dual thruster maximum input power is limited by the ion optics current-extraction-capability. That is, the engine is much more capable of taking full-advantage of the ion optics electrostatics than the NEXT thruster. At about 3340 seconds specific impulse and below, the maximum input power and thrust are equivalent to the NEXT thruster.

TABLE 5

| Attribute | NEXT Ion Thruster | Dual Engine B (Tables 2 and 3) |
|---|---|---|
| Beam Area, $cm^2$ | 1257 | 1257 |
| Discharge Chamber Anode Surface Area, $cm^2$ | 3334 | 7954 |
| Maximum Sustainable Discharge Current, A | ≤35 | ≤84 |
| Maximum Anode-Area-Limited Beam Current, A | ≤7.0 | ≤16.8 |

| Specific Impulse, sec | Max. Beam Current, A | Anode Area - or - Optics Limited | Max. Input Power, kW | Max. Thrust, mN | Max. Beam Current, A | Anode Area - or - Optics Limited | Max. Input Power, kW | Max. Thrust, mN |
|---|---|---|---|---|---|---|---|---|
| 4434 | 7.04 | Anode | 13.646 | 472.1 | 16.8 | Anode | 32.501 | 1127 |
| 4139 | 7.04 | Anode | 12.042 | 440.8 | 14.5 | Optics | 24.755 | 907.8 |
| 3908 | 7.04 | Anode | 10.865 | 416.2 | 11.0 | Optics | 16.951 | 650.2 |
| 3592 | 7.04 | Anode | 9.371 | 382.5 | 7.30 | Optics | 9.715 | 396.6 |
| 3338 | 7.04 | Anode/Optics | 8.287 | 355.5 | 7.04 | Optics | 8.287 | 355.5 |
| 3188 | 7.04 | Anode/Optics | 7.689 | 339.5 | 7.04 | Optics | 7.689 | 339.5 |
| 3031 | 7.04 | Anode/Optics | 7.082 | 322.8 | 7.04 | Optics | 7.082 | 322.8 |
| 2733 | 7.04 | Anode/Optics | 6.027 | 291.0 | 7.04 | Optics | 6.027 | 291.0 |

The data in Table 5 for the dual thruster are conservative estimates. This is because: a) the 1.7% increases in both specific impulse and thrust expected with the dual thruster due to the flat-geometry electrodes were not included; and b) the design of the dual thruster assumed the same ion optics electrostatic design as that of the NEXT thruster. The dual thruster could in fact incorporate an advanced-perveance ion optics design in an annular configuration—while maintaining the same beam area as the NEXT thruster optics. This dual thruster design would yield an increase in input power and thrust as compared to that documented in Table 5. It should be noted that there would be no advantage to applying advanced-perveance ion optics configuration to the NEXT thruster since its maximum beam current is already limited or inhibited by the anode-area.

Figure 12:
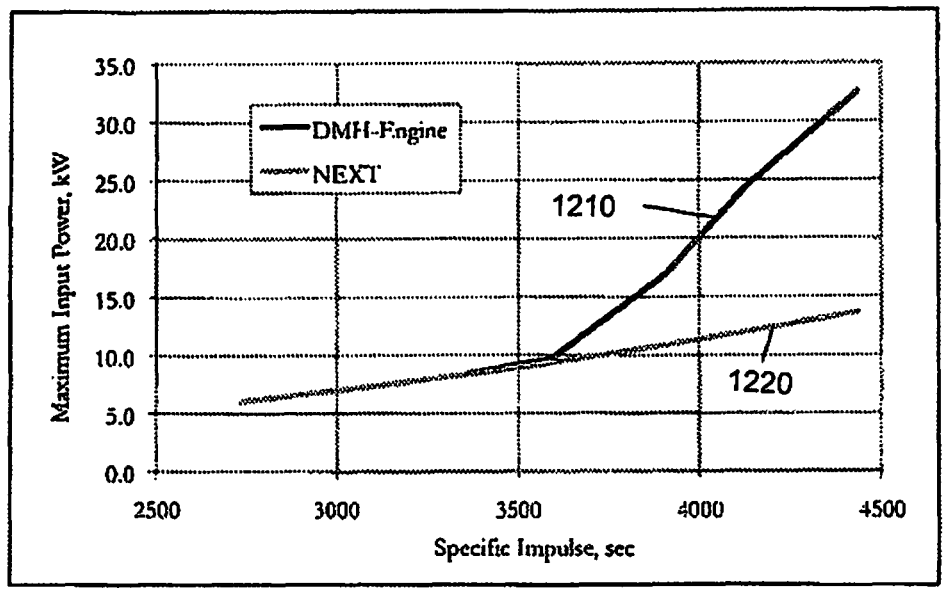
FIG. 12 is a plot illustrating maximum input power and specific impulse for an exemplary electric propulsion machine.

With reference now to FIG. 12, a graph illustrates the differences in maximum input power as a function of specific impulse for the Dual Engine B 1210 in Table 5 and an exemplary current thruster 1220 (NEXT) of equivalent beam area and electrode geometry and as set forth in Table 5. As can be seen, the slope of the curve 1210 dramatically increases above 3500 seconds specific impulse.

Figure 13:
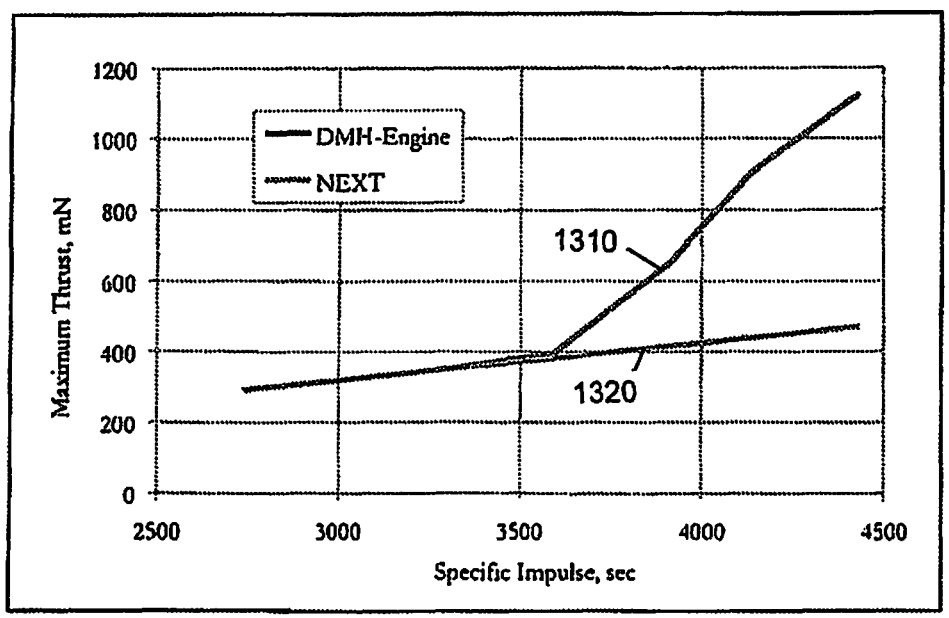
FIG. 13 is a plot illustrating maximum thrust and specific impulse for an exemplary electric propulsion machine.

With reference now to FIG. 13, a graph illustrates the differences in maximum thrust capability as a function of specific impulse for the Dual Engine B 1310 in Table 5 and an exemplary current thruster 1320 (NEXT) of equivalent beam area and electrode geometry and as set forth in Table 5. As can be seen, the slope of the curve 1310 dramatically increases above 3500 seconds specific impulse.

It can now be appreciated that many variations of the dual thruster described here are possible. For example: using a second, or interior thruster other than a Hall-effect component, combining various sizes of Hall-effect components and ion components, to yield difference total specific impulse throttling ranges, and different total ranges in input power and thrust capability—depending upon the application need. One case example is provided here to define overall performance of a dual thruster. This example is for illustration, with the performance characteristics quoted specific to the selected configuration. As such the performance numbers documented do not imply any particular limits in capability to the dual thruster concept in general.

Table 6 lists the projected performance capabilities of one embodiment of a dual thruster, with a Hall-effect component having physical characteristics similar to that of the NASA GRC 300M Hall thruster, and an Ion component with beam area equivalent to the NASA NEXT Ion thruster. The performance of the Hall-effect component with specific impulse was modeled assuming a similar efficiency-specific impulse characteristic as the BPT-4000 Hall-Effect thruster, with a nominal input power of 20 kW at 2000 seconds specific impulse which is the design basis for the 300M.

The ion component of the dual thruster was modeled in a fashion consistent with prior ion thruster performance modeling conducted by this author assuming a discharge chamber propellant efficiency of 0.92. The performance gains due to the elimination of the thrust-losses associated with domed ion optics were included in these calculations. Additionally, an advanced-perveance ion optics electrode design was assumed using equation 15 of Patterson, M. J., "NEXT Study of Thruster Extended-Performance II (NEXT STEP II).

TABLE 6

| Mode | Specific Impulse, sec | Input Power, kW | Thrust, mN | Thrust-to-Power Ratio, mN/kW | Efficiency |
|---|---|---|---|---|---|
| Hall-Effect | 1220 | 4.440 | 351.1 | 79.0 | 0.473 |
| Hall-Effect | 1440 | 5.560 | 408.9 | 73.6 | 0.520 |
| Hall-Effect | 1610 | 6.670 | 457.8 | 68.7 | 0.542 |
| Hall-Effect | 1740 | 7.780 | 510.0 | 65.6 | 0.560 |
| Hall-Effect | 1840 | 13.330 | 844.4 | 63.3 | 0.572 |
| Burst | 1840 | 19.201 (13.330 + 5.871) | 1196 (844.4 + 351.5) | 62.3 | 0.562 |
| Burst | 1960 | 26.362 (20.000 + 6.362) | 1610 (1236 + 374.5) | 61.1 | 0.587 |
| Burst | 2150 | 27.206 (20.000 + 7.206) | 1540 (1129 + 411.0) | 56.6 | 0.597 |

TABLE 6-continued

| Mode | Specific Impulse, sec | Input Power, kW | Thrust, mN | Thrust-to-Power Ratio, mN/kW | Efficiency |
|---|---|---|---|---|---|
| Ion | 2150 | 7.206 | 411.0 | 57.0 | 0.602 |
| Ion | 2207 | 7.471 | 421.7 | 56.4 | 0.611 |
| Ion | 2298 | 7.912 | 439.0 | 55.5 | 0.625 |
| Ion | 2538 | 9.172 | 484.9 | 52.9 | 0.658 |
| Ion | 2758 | 10.432 | 526.9 | 50.5 | 0.683 |
| Ion | 2774 | 12.188 | 614.1 | 50.4 | 0.685 |
| Ion | 3076 | 13.703 | 648.5 | 47.3 | 0.714 |
| Ion | 3235 | 15.634 | 716.3 | 45.8 | 0.727 |
| Ion | 3387 | 16.875 | 750.0 | 44.4 | 0.738 |
| Ion | 3645 | 19.561 | 823.6 | 42.1 | 0.752 |
| Ion | 3966 | 25.691 | 1010 | 39.3 | 0.765 |
| Ion | 4200 | 28.573 | 1070 | 37.5 | 0.771 |
| Ion | 4499 | 32.501 | 1146 | 35.3 | 0.778 |

Note in Table 6, 'Hall-Effect Mode' refers to the Hall-effect component operating solely (from 1220-1840 seconds specific impulse), 'Ion Mode' refers to the ion component operating solely (from 2150-4500 seconds specific impulse), and 'Burst Mode' refers to both components operating simultaneously. In this example case, burst mode is operated in the specific impulse 'overlap-zone' of 1840-2150 seconds specific impulse. The individual input power and thrust contributions of the two components in burst mode are documented in Table 6, with the first number associated with the Hall-effect component and the second number associated with the ion component.

As noted in Table 6, this dual thruster provides a continuous-throttling capability from 1220-4500 seconds specific impulse (3.7:1 range), with an input power range of 4.44-32.5 kW (7.3:1), thrust of 351-1146 mN (3.3:1), and efficiency of 0.47-0.78. A peak in input power and thrust occur over the specific impulse overlap-zone of the burst mode, with slight reduction in efficiency in this region.

Figure 14:
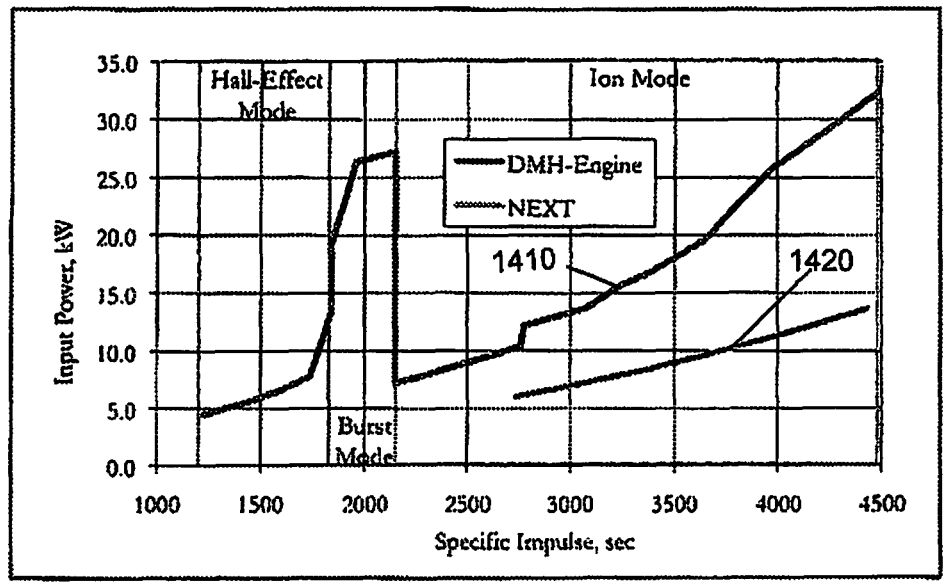
FIG. 14 is a plot illustrating input power and specific impulse for an exemplary electric propulsion machine.

With reference now to FIG. 14, input power vs. specific impulse for the dual thruster of Table 6 is graphed at 1410. For comparison, input power vs. specific impulse for the maximum input power of a NEXT ion thruster is graphed at 1420.

Figure 15:
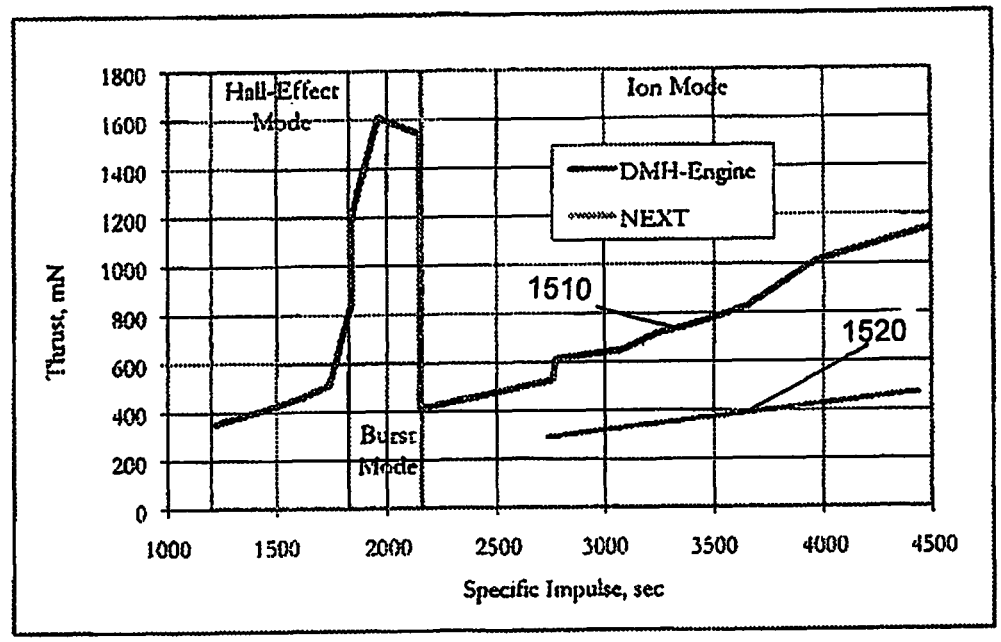
FIG. 15 is a plot illustrating thrust and specific impulse for an exemplary electric propulsion machine.

With reference now to FIG. 15, thrust vs. specific impulse for the dual thruster of Table 6 is graphed at 1510. For comparison, thrust vs. specific impulse for the maximum input power of a NEXT ion thruster is graphed at 1520.

Figure 16:
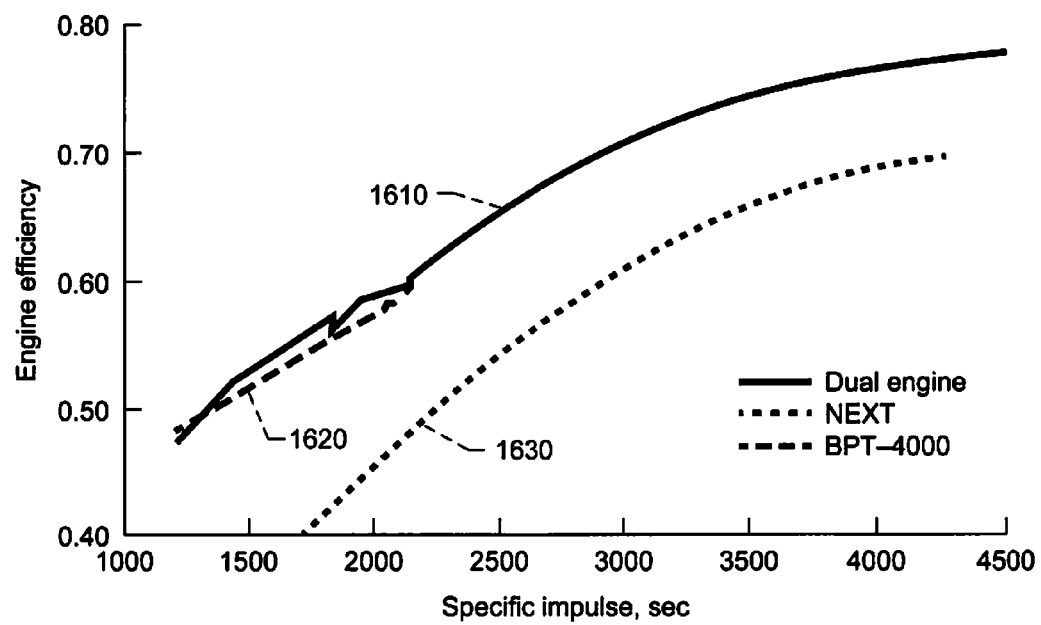
FIG. 16 is a plot illustrating engine efficiency vs. specific impulse of an exemplary electric propulsion machine.

As seen in FIG. 16 a significant efficiency gain is expected for the dual thruster during operation in 'Ion Mode' (>2150 seconds specific impulse) as compared to current EPTs. These efficiency gains are due to the elimination of divergence-losses associated with the ion optics geometry, along with other efficiency gains as a consequence of the fact that the dual thruster is operating at much higher input power levels at a given specific impulse.

The dual thruster could be applied to any application for which the high thrust-to-power characteristics of a Hall-effect thruster and high specific impulse capability of an ion thruster would be advantageous. For example: those Earth-orbital applications requiring both primary and auxiliary electric propulsion functions; Earth-orbital applications requiring both rapid orbit changes and fuel-efficient less-time-critical orbital changes; and Planetary mission applications requiring both fuel-efficient high-delta-V transfers and on-orbit high thrust-to-power operations.

In one embodiment of a dual thruster, the Hall-effect or other suitable second thruster component and the ion component may have approximately the same input power capabilities at their nominal design specific impulses (about 2000 seconds for Hall-effect and 3600 seconds for ion). This geometry is referred to here as a 'Matched-Dual-Mode.' This configuration is that provided in the example case earlier, and would be appropriate if both components were required to perform a primary-propulsive application.

In an alternative embodiment, referred to here as a 'Mixed-Dual-Mode,' involves combining a Hall-effect or other suitable second thruster component and an ion component with markedly-different input power capabilities at their respective nominal design specific impulses. This may be most-appropriate if one component were required to provide primary propulsion and the other component provide auxiliary propulsiom; for example, combining a high-power Hall-effect component core (such as the NASA, GRC 300M) for rapid (Earth) orbital transfers with a low-power ion component (for example, beam area equivalent to the NASA NSTAR thruster) for station-keeping. These configuration options are captured in Table 7.

|  |  | Ion Component | | |
|---|---|---|---|---|
|  |  | Low Power | Intermediate-Power | High Power |
| Hall-Effect Component | Low-Power | Matched | Mixed | Mixed |
|  | Intermediate-Power | Mixed | Matched | Mixed |
|  | High Power | Mixed | Mixed | Matched |

Figure 17:
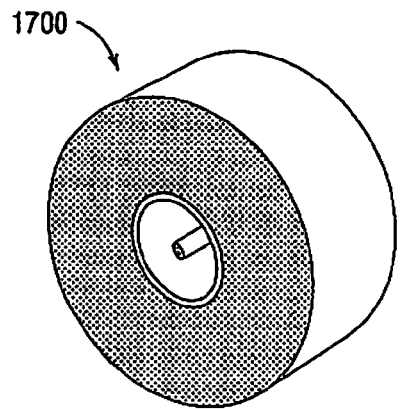
FIG. 17 is a side perspective view of one embodiment of an annular geometry engine.

In still additional embodiments, annular engine concepts could be implemented in a variety of other physical manifestations, depending upon the intended application. For example, as illustrated in FIG. 17, a stand-alone annular geometry engine 1700 may be implemented simply as an ion thruster. One advantage of the concept is that it provides a means of extending the power range (scalability) of ion thruster technology to >>10 kW at modest levels of specific impulse (<5,000 seconds). This is because the ion optics enable very-large beam areas while limiting both the span and span-to-gap of the electrodes for the high-perveance designs needed for this power and Isp range. Other potential advantages of the concept include the ability to operate at much higher power and thrust densities than state of the art thrusters due to increased anode area, as well as improved efficiencies, longer lifetimes, and the like.

One attribute of an annular geometry ion thruster includes scalability to high power. For example, input power levels may be increased by greater than ten times current state of the art ion thrusters. The annular-geometry ion optics should allow for scaling of ion thrusters to very high power (>100's of kW) at specific impulse values of interest (≤5,000 sec) by permitting very-large beam areas with relatively small electrode spans, and relatively small span-to-gap ratios. This is expected to reduce the manufacturing and the mechanical and thermal stability issues encountered with attempts to increase the beam area via increasing the diameter of spherically-domed ion optics used on conventional cylindrical ion thrusters; typically limited to ≤50 cm diameter. Moreover, the annular geometry ion thruster approach allows for a dramatic reduction in optics span, and span-to-gap ratio for a given beam area over ion optics of conventional design: typically a four to six times reduction in span and span-to-gap ratios.

Another attribute includes operation at higher power and thrust densities. For example up to three times greater than current state of the art ion thrusters. The annular-shaped discharge chamber increases the effective anode-surface area for electron-collection as compared to a conventional cylindrically-shaped ion thruster of equivalent beam area. This is expected to allow the ion thruster component to operate utilizing the full-perveance capability of the ion optics, and not have its maximum input power level limited by the available anode surface area. This increase in anode surface area should allow the annular geometry thruster to operate at higher discharge currents and therefore potentially higher beam currents and input power levels than a current ion thruster of equivalent beam area for a given specific impulse: typically a two or three times increase in power density.

Another attribute includes improved efficiencies over state of the art ion thrusters. Annular-geometry ion optics of small span should have a sufficiently-high first mode natural frequency to allow for the application of flat electrodes. Flat electrodes will yield improved thrust to power-ratios and efficiencies as compared to current ion thrusters by eliminating the off-axis beam vectoring associated with spherically-domed ion optics electrodes used on cylindrical thrusters. For example, the application of flat electrodes on the NEXT ion thruster would yield a ~3-4 percentage point increase in efficiency across its entire specific impulse throttling range.

Yet another attribute includes practical implementation of carbon and improved lifetimes over current ion thrusters. The use of small span and flat electrode geometry for the ion optics should allow for the practical implementation of carbon for larger areas, in the form of pyrolytic graphite (PG) panels, and thereby eliminate the thruster primary-failure mode. Application of carbon electrodes for ion thrusters is advantageous due to its nearly order-of-magnitude improvement in life capability associated with its reduced sputter-yield relative to conventional refractory metals. The implementation of carbon—in both carbon-carbon and PG form—for conventional ion thruster electrodes have to date been inhibited by manufacturing limitations. Because of the relatively-simple physical design of the electrodes, these manufacturing limitations are circumvented—thereby allowing the practical implementation of carbon and hence the life time enhancements of this material.

Still another attribute includes implementation of high-perveance ion optic designs. Because of reduced span and space-to-gap requirements, and flat electrode configuration, higher-perveance designs (thinner electrodes, higher open-area-fraction electrodes, and/or reduced inter-electrode gaps) could potentially be enabled with annular-geometry flat ion optics, or shaped optics cooperating to cover or partially cover the exhaust annulus thereby allowing for operation at higher thrust densities.

Additionally, the annular discharge chamber design of the annular geometry engine provides for efficient packaging by providing a central position for mounting the neutralizer cathode within the annulus, thereby reducing the outer profile of the engine and eliminating the need for a cantilevered-outboard neutralizer cathode employed on conventional ion thrusters. As described more fully below, the annular design also allows for the potential to incorporate multiple annular discharge thrusters packaged into concentric rings, or for integration of other electric propulsion devices or chemical thrusters within the annulus. This would also allow for a shared gimbal platform.

Figure 18:
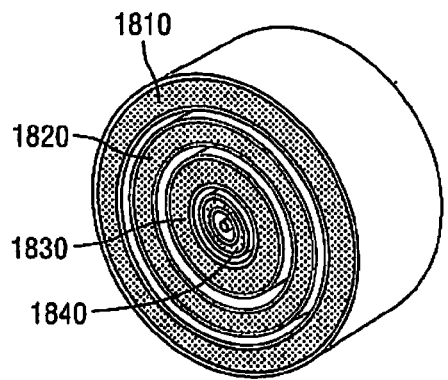
FIG. 18 is a side perspective view of one embodiment of a multiple ring annular geometry engine.

As illustrated in FIG. 18, a multi-ring annular geometry engine may include multiple concentric annular geometry engine rings 1810, 1820, 1830, 1840 integrated into a nested-configuration, for example the 4-ring configuration shown, with each ring operating individually or in combination. Such a configuration may increase the effective power throttling range of the engine to >100:1, with each ring providing individually or collectively the aforementioned performance attributes.

Figure 19:
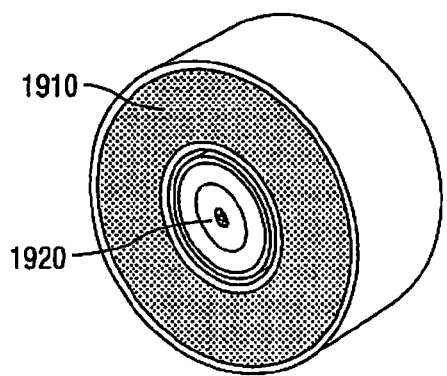
FIG. 19 is a side perspective view of one embodiment of an annular geometry engine with another thruster.

In yet another embodiment, illustrated in FIG. 19, a multi-mode thruster could combine an annular geometry engine 1910 with another thruster 1920—for example, a centrically mounted Hall Effect Thruster (HET). This permits a single integrated assembly using common propulsion elements (gimbal platform, power electronics, and feed system). Additionally, this permits a mechanism to achieve the combined performance characteristics of both EP thruster technologies into a single integrated assembly—operating over the broadest possible Isp range and doing so matching or exceeding the efficiency of multiple current state of the art thrusters at high power.

Another multi-mode thruster configuration includes an annular geometry engine, 1910, and a chemical thruster mounted as the other thruster 1920. For example, the electric/electric thruster hybrids and the electric/chemical thruster hybrids provide the potential for 'dual-mode' operation; combining high-Isp and high-thrust capabilities on a common platform. As discussed, for the electric/electric thruster hybrid, this could have two manifestations: a 'matched-mode' where both the annular geometry engine and the alternate electric thruster technology are sized to operate at comparable power levels—each providing primary propulsion functions; and a 'mixed-mode' where the annular geometry engine is a much lower power device, providing an on-station (auxiliary) high-Isp capability to complement a high power electric thruster used for primary propulsion. In the latter configuration the annular geometry engine may comprise a very-narrow span annular ring, concentrically and radially outwardly mounted around another electric thruster technology (a large HET, for example).

Figure 20:
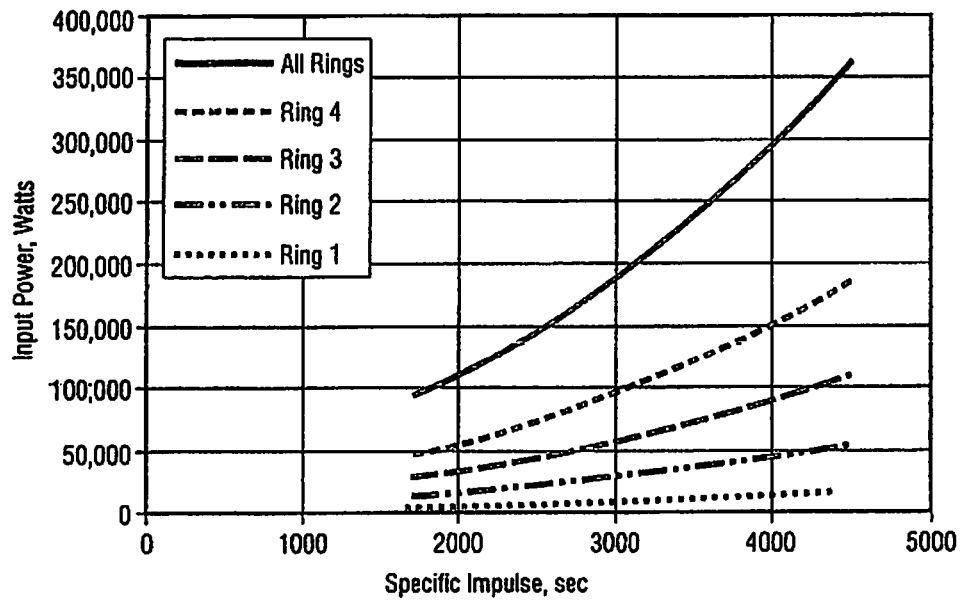
FIG. 20 is a plot illustrating input power and specific impulse for an exemplary electric propulsion machine such as that illustrated in FIG. 18.

FIG. 20 plots estimated maximum input power vs. Isp for each of an exemplary 4 ring multiple concentric annular geometry engine depicted in FIG. 18, as well as the total input power into such an engine assuming the simultaneous operation of all 4 rings. A constant span of 17 cm was assumed for all rings, with the outer-most ring having an outside diameter of approximately 1.5 m. As noted, with the simultaneous operation of all rings, input power levels exceeding 0.10 MW could be processed above about 1,800 seconds Isp, and >0.30 MW processed above about 4,000 seconds Isp. Over the approximately 1,700-4,500 Isp range indicated the total thrust produced by the 4-ring engine would range from about 4.7-12.4 Newtons.

Figure 21:
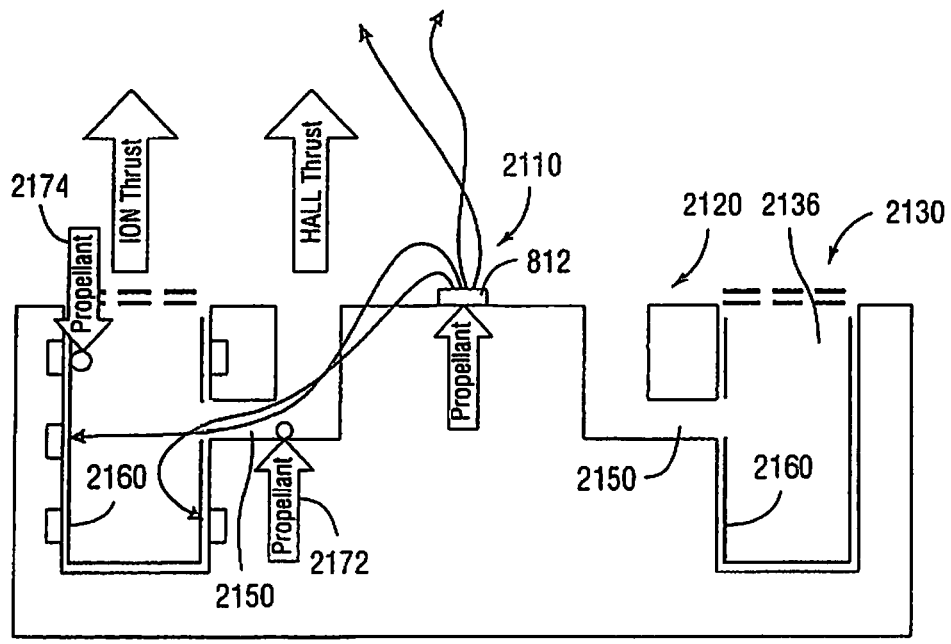
FIG. 21 is a side cross-sectional view of an alternate manifestation of an electric propulsion machine.

With reference now to FIG. 21, in another embodiment of the multi-mode thruster, it may be advantageous to eliminate the discharge cathode assembly (DCA), and rely on a central common neutralizer cathode assembly (NCA) 2110 for plasma generation and beam neutralization of both the Hall-effect thruster component 2120 and ion thruster component 2130 of the multi-mode thruster through radial channels or slots 2250 between the two components. Such a multi-mode thruster may include an anode 2160 disposed in the annular discharge chamber 2136 common to both the Hall-effect thruster component 2120 and ion thruster component 2130. The central common neutralizer cathode assembly 2110 may provide both discharge plasma generation and beam neutralization, where mode of operation may be determined by main propellant flow through the dual plena 2172, 2174.

Figure 22:
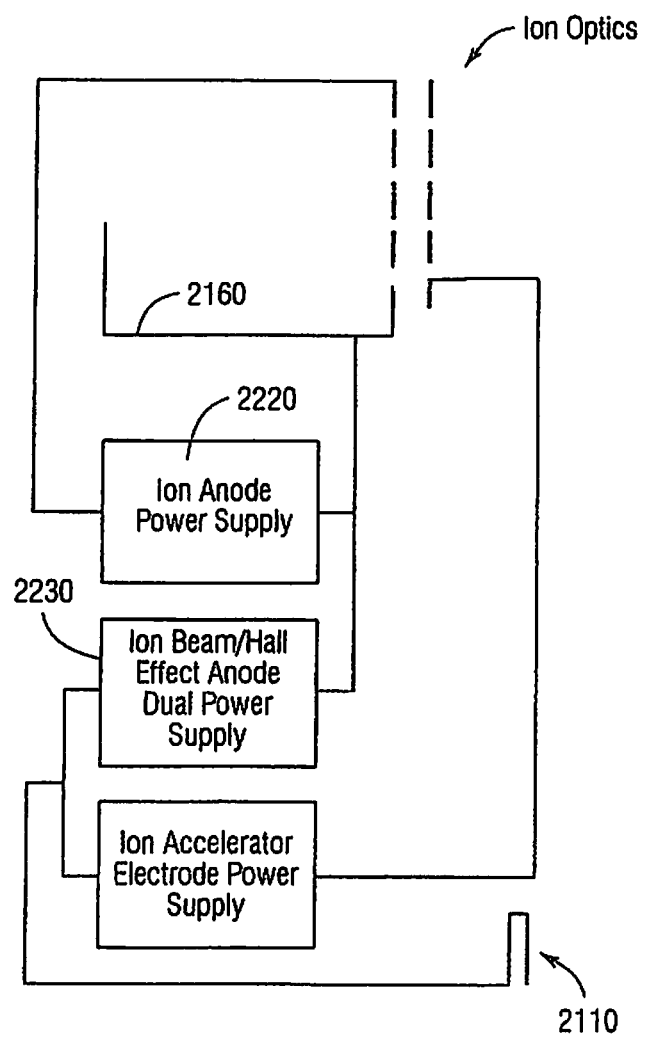
FIG. 22 is a simplified electric power circuit for an electric propulsion machine such as that illustrated in FIG. 21.

With reference now to FIG. 22, a simplified electrical schematic for one multi-mode thruster embodiment having a central common neutralizer cathode assembly 2110 and common anode 2160 is shown. Although there is no separate Hall anode in this embodiment, the ion anode power supply 2220 and the Ion Beam/Hall Effect Anode Dual Power supply 2230 remain to provide a bias voltage to the screen electrode of the ion optics.

In another embodiment, variations of ion optics are provided. The annular geometry ion optics or ion optic components should allow for scaling of ion thrusters to high power (>100's of kW) at specific impulse values of interest (≤5,000 sec) by permitting very large beam areas with relatively small electrode spans and relatively small span-to-gap ratios. The reduces manufacturing issues and mechanical and thermal stability issues encountered with attempts to increase the beam area via increasing the diameter of spherically domed ion optics used on conventional cylindrical ion thrusters which are typically limited to ≤50 cm diameter. The annular ion thruster allows for dramatic reduction in optics span and hence span-to-gap ratios for a given beam area, typically a four to six times reduction in span and span-to-gap ratios. There are manufacturing limitations to the fabrication of pyrolytic graphite (PG) which is a candidate material for ion optics, annular or otherwise.

Figure 23:
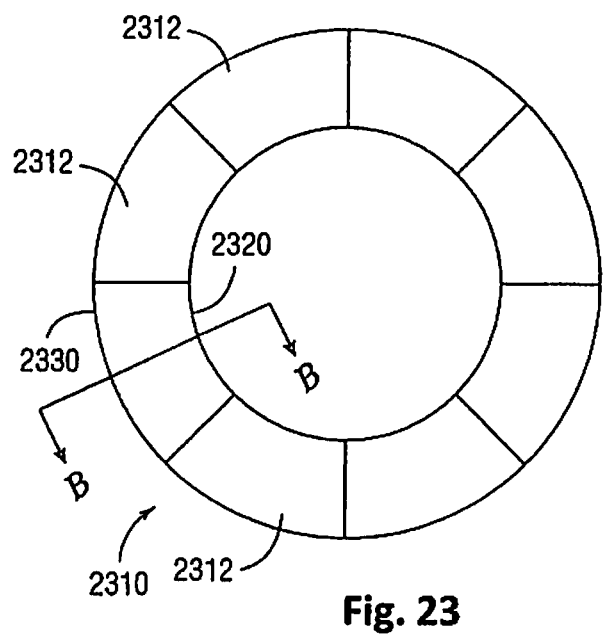
FIG. 23 is a top plan view of one embodiment of an ion optic frame.
Figure 24:
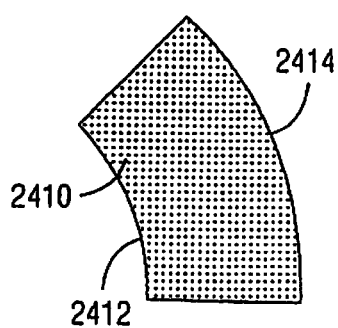
FIG. 24 is a top plan view of one embodiment of a segmented ion optic panel.
Figure 25:
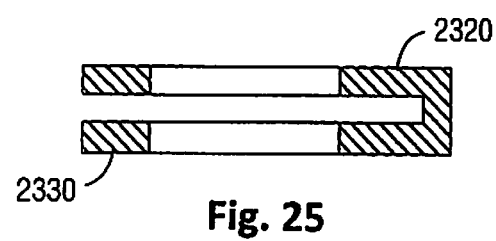
FIG. 25 is a cross sectional view of one embodiment of an ion optic frame taken along line B-B.

With reference to FIGS. 23-25, a frame 2310, such as a carbon rib frame may be connected to the exhaust annulus of an annular ion thruster. The frame 2310 may include an interior frame portion 2320 and an opposing exterior frame portion 2330 and be divided into a set of segments 2312. A segmented ion optic panel 2410 may be configured with an interior arcuate edge 2412 and an exterior arcuate edge 2414 (or shapes approximating an arc) suitable to be received in the frame 2310, specifically, by inserting the segmented ion optic panel 2410 through the exterior frame portion 2330 and into the complementary grooved or shaped interior frame portion 2320. In certain embodiments, the segments 2312 may be brazed or otherwise connected together into a one-piece frame 2310 while in other embodiments, the segments 2312 may be individually affixed to the discharge side of the thruster. Where it is desirable to make individual panels 2410 common to differently sized annular geometry or other ion thrusters, the panels 2410 may be uniformly sized and shaped. Such uniformity in panels may further reduce complexity and the need to manufacture varying specific panels for use in specific thrusters. For example, the panels may be circular, rectangular or otherwise to be connected to or within a complementary shaped frame so long as there is high physical transparency at the plane of the screen electrode.

Figure 26:
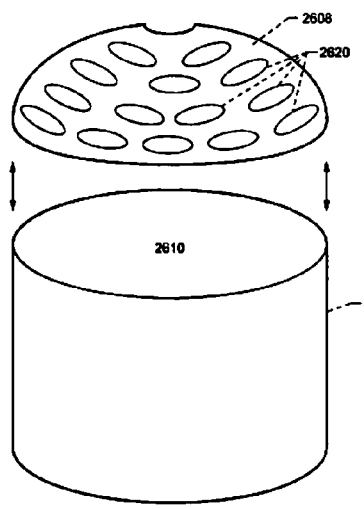
FIG. 26 is a perspective, exploded, view of selected components of an electric propulsion machine.
Figure 27:
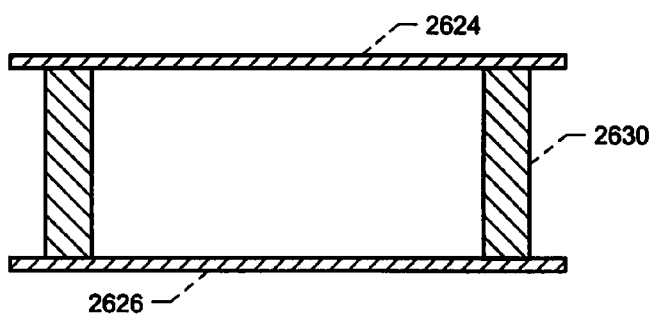
FIG. 27 is a simplified side view of one embodiment of a shaped ion optic electrode pair.
Figure 28:
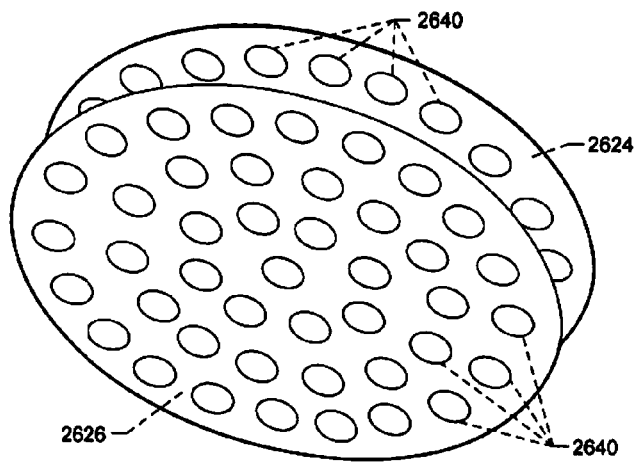
FIG. 28 is a perspective view of one embodiment of a shaped ion optic electrode pair.

With reference now to FIGS. 26, 27 and 28 a cylindrical ion thruster 2602 is illustrated. A frame 2608, corresponding to an exhaust 2610 is configured as a spherical dome, although the frame could also be substantially planar, or convex or concave relative to the thruster body. The frame 2608 includes a plurality of receptacles 2620 dispersed across its surface. Pairs of ion optic electrodes 2624, 2626 may be sized and shaped to correspond with the plurality of receptacles 2620. The electrodes 2624, 2626 may be connected to the frame or held in place adjacent to the receptacles 2620. In one embodiment, the pairs of ion optic electrodes 2624, 2626 comprise parallel, planar, pyrolytic graphite (PG) electrodes and are all interchangeable among the plurality of receptacles 2620, while in another embodiment only select ion optic electrodes 2624, 2626 are interchangeable, while in still another, although less desirable at the current time, embodiment, each one of the ion optic electrode pairs 2624, 2626 are custom sized and or shaped for respective receptacles 2620. The pairs of ion optic electrodes 2624, 2626 are electrically insulated from each other, for example by an insulating spacer 2630 connecting the ion optic electrodes 2624, 2626. The electrodes 2624, 2626, include closely-spaced apertures 2640, usually but not necessarily circular, through the thickness and aligned between the electrodes 2624, 2626. In one example, on the outer most or down-stream electrode 2624, the apertures may be 0.075" in diameter with 0.093" center-to-center spacing in a hexagonal array, so the electrode has a very high open area fraction. Using the example, across any 1-inch span there would be ~10 apertures 2640. An additional benefit from the use of a plurality of ion optic electrode pairs manifests itself by enabling a span to gap ratio of less than 300:1, preferably less than 100:1.

In another embodiment shown in FIGS. 29 and 30 an annular frame 2910 includes a series of compartments 2920 corresponding to pairs of shaped ion optic electrodes 2924 (not shown) and 2926. The annular frame 2910 permits larger radius exhaust compared with those currently obtainable and eases manufacturing challenges caused by dome shaped optics solutions. FIG. 30 depicts an example shaped ion optic electrode pair 2926 (one shown) with aligned apertures 3010 between the upstream and downstream electrodes.

In another embodiment shown in FIG. 31, a flat, annular, ion optic frame 3110 includes a plurality of receptacles 3120 dispersed throughout the frame. As with other illustrations, the size and spacing shown is not necessarily representative of actual systems, rather the illustration is not to any scale but rather to depict certain elements with clarity. Each receptacle is similarly sized to permit interchangeable ion optic pairs 3124 (not shown), 3126. It can now be appreciated that a wide variety of sized and shaped electrodes may be employed in other embodiments of the ion optic systems described here.

With reference now to FIG. 32, a dome shaped frame, 3210 includes a downstream portion 3212 and an opposed upstream portion 3214. Complementary receptacles 3220 are aligned to permit location of shaped downstream and upstream ion optic electrodes (not shown). Additionally, electrical connections may be included within the respective frame portions or connected thereto to establish the ion thruster electrical field.

With reference now to FIG. 33, a flat, annular frame 3310 includes a downstream portion 3312 and an opposed upstream portion 3314. Complementary receptacles 3320 are aligned to permit location of shaped downstream and upstream ion optic electrodes (not shown). Additionally, electrical connections may be included within the respective frame portions or connected thereto to establish the ion thruster electrical field. In another embodiment, the ion optic electrode pairs may include an insulating connector allowing the electrode pairs to be connected together. In still another embodiment, the receptacles may be sized to permit a periphery of one of the upstream or downstream electrodes to engage a periphery of the receptacle. Similarly, the receptacles may be sized to permit a periphery of each the upstream and downstream electrodes to connect to a periphery of the upstream and downstream frame portions respectively.

Referring now to FIG. 34, an alternate dome shaped frame 3412 is illustrated. The frame 3412 includes a plurality of receptacles 3420 complementarily sized to accommodate one of a pair of electrodes (not shown). For example, an upstream electrode may connect with a frame receptacle

3420 and a downstream electrode, insulatedly connected to the upstream electrode may be spaced from the frame. In an alternate but similar embodiment, a downstream electrode may connect with a frame receptacle 3420 with the upstream electrode connected thereto. FIG. 35 illustrates an embodiment using a planar frame 3512 including a plurality of receptacles 3520. It may now be appreciated that other configurations such as annular, concave and concave frames may alternately be employed.

Referring to FIG. 36, a simplified example of an electrical schematic 3610 is illustrated showing electrical connections of the upstream electrodes, 3624 and downstream electrodes, 3626. Additionally, the circuit may electrically connect the electrodes in parallel.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. An ion propulsion system comprising:
    a discharge chamber, wherein the discharge chamber has a closed end and an opposite exhaust end;
    a frame mounted at the exhaust end, the frame including receptacles, each receptacle being laterally spaced from every other receptacle, wherein the receptacles are uniformly spaced throughout the frame; and
    ion optic electrode pairs,
        wherein each ion optic electrode pair comprises apertures aligned between a respective first upstream electrode and a respective second downstream electrode,
        wherein each ion optic electrode pair is planar,
        wherein each ion optic electrode pair receives ions from the discharge chamber in operation, and
        wherein each ion optic electrode pair is disposed in one of the receptacles of the frame.

2. The ion propulsion system of claim 1, wherein the frame is annular.

3. The ion propulsion system of claim 1, wherein the frame is domed.

4. The ion propulsion system of claim 1, wherein the ion optic electrode pairs have a ratio of span to gap between 300:1 and 69:1.

5. The ion propulsion system of claim 1, wherein the first upstream electrode of each ion optic electrode pair is connected to the second downstream electrode of the respective ion optic electrode pair by an electric insulator.

6. The ion propulsion system of claim 1, wherein the plurality of electrodes are commonly sized.

7. An ion propulsion system comprising:
    a discharge chamber, wherein the discharge chamber has a closed end and an opposite exhaust end;
    a frame mounted at the exhaust end, the frame including receptacles, each receptacle being laterally spaced from every other receptacle, wherein the frame is annular; and
    ion optic electrode pairs,
        wherein each ion optic pair electrode comprises apertures aligned between a respective first upstream electrode and a respective second downstream electrode,
        wherein each ion optic electrode pair is planar,
        wherein each ion optic electrode pair receives ions from the discharge chamber in operation, and
        wherein each ion optic electrode pair is disposed in one of the receptacles of the frame.

8. An ion propulsion system comprising:
    a discharge chamber, wherein the discharge chamber has a closed end and an opposite exhaust end;
    a frame mounted at the exhaust end, the frame including receptacles, each receptacle being laterally spaced from every other receptacle, wherein the frame is domed; and
    ion optic electrode pairs,
        wherein each ion optic pair comprises apertures aligned between a respective first upstream electrode and a respective second downstream electrode,
        wherein each ion optic electrode pair is planar,
        wherein each ion optic electrode pair receives ions from the discharge chamber in operation, and
        wherein each ion optic electrode pair is disposed in one of the receptacles of the frame.

9. An ion propulsion system comprising:
    a discharge chamber, wherein the discharge chamber has a closed end and an opposite exhaust end;
    a frame mounted at the exhaust end, the frame including receptacles, each receptacle being laterally spaced from every other receptacle, wherein the frame is planar; and
    ion optic electrode pairs,
        wherein each ion optic electrode pair comprises apertures aligned between a respective first upstream electrode and a respective second downstream electrode,
        wherein each ion optic electrode pair is planar,
        wherein each ion optic electrode pair receives ions from the discharge chamber in operation, and
        wherein each ion optic electrode pair is disposed in one of the receptacles of the frame.

10. An ion propulsion system comprising:
- a discharge chamber, wherein the discharge chamber has a closed end and an opposite exhaust end;
- a frame mounted at the exhaust end, the frame comprising connectable segments, each segment having at least one receptacle, each receptacle being laterally spaced from every other receptacle; and
- ion optic electrode pairs,
    - wherein each ion optic electrode pair comprises apertures aligned between a respective first upstream electrode and a respective second downstream electrode,
    - wherein each ion optic electrode pair is planar,
    - wherein each ion optic electrode pair receives ions from the discharge chamber in operation, and
    - wherein each ion optic electrode pair is disposed in one of the receptacles of the frame.

* * * * *